(12) United States Patent  (10) Patent No.: US 8,346,020 B2
Guntur  (45) Date of Patent: Jan. 1, 2013

(54) AUTOMATED GENERATION OF 3D MODELS FROM 2D COMPUTER-AIDED DESIGN (CAD) DRAWINGS

(75) Inventor: S. Rao Guntur, Houston, TX (US)

(73) Assignee: Zentech, Inc., Houston, TX (US)

( * ) Notice: Subject to any disclaimer, the term of this patent is extended or adjusted under 35 U.S.C. 154(b) by 915 days.

(21) Appl. No.: 12/434,538

(22) Filed: May 1, 2009

(65) Prior Publication Data

US 2010/0092072 A1  Apr. 15, 2010

Related U.S. Application Data

(60) Provisional application No. 61/050,117, filed on May 2, 2008.

(51) Int. Cl.
 *G06K 9/32* (2006.01)
 *G06K 9/36* (2006.01)
 *G06T 17/00* (2006.01)
(52) U.S. Cl. .................. 382/293; 382/285; 345/420
(58) Field of Classification Search .............. 382/293
 See application file for complete search history.

(56) References Cited

U.S. PATENT DOCUMENTS

| | | | | |
|---|---|---|---|---|
| 5,852,442 | A * | 12/1998 | Morito | 345/419 |
| 5,870,099 | A * | 2/1999 | Horii et al. | 345/427 |
| 5,945,995 | A * | 8/1999 | Higuchi et al. | 345/420 |
| 6,215,493 | B1 * | 4/2001 | Fujita | 345/418 |
| 6,629,065 | B1 * | 9/2003 | Gadh et al. | 703/1 |
| 7,492,364 | B2 * | 2/2009 | Devarajan et al. | 345/420 |
| 2003/0071810 | A1 * | 4/2003 | Shoov et al. | 345/420 |
| 2004/0153824 | A1 * | 8/2004 | Devarajan et al. | 714/38 |
| 2006/0233461 | A1 * | 10/2006 | Ma et al. | 382/285 |
| 2007/0260432 | A1 * | 11/2007 | Okada | 703/1 |
| 2008/0100616 | A1 * | 5/2008 | Yamazaki et al. | 345/420 |

OTHER PUBLICATIONS

PCT/US09/42613, International Search Report and the Written Opinion of the International Searching Authority mailed Jun. 19, 2009.
Noh et al., "Animated Deformations with Radial Basis Functions", University of Southern California, pp. 1-9, 2000.
Citation for Noh et al., URL:<http://portal.acm.org/citation.cfm?id=502390.50422>, retrieved from Internet on Jun. 15, 2009, pp. 1-5.
David Warren Clement, "The Use of Computer-Aided Design in the Historic Preservation Field", Texas Tech University, May 1990.
Marchand et al., "A 2D-3D Model-Based Approach to Real-Time Visual Tracking", Institut National De Recherche En Informatique Et En Automatique, France, Mar. 2000.

* cited by examiner

*Primary Examiner* — David Zarka
(74) *Attorney, Agent, or Firm* — Baker & McKenzie LLP

(57) ABSTRACT

The process and method for generating a 3D model from a set of 2D drawings is described herein. Traditionally, many structural components (objects) are communicated through a series of 2D drawings, wherein each drawing describes the components that are visible in a user-selected view direction. No machine-readable information in the drawings define a relationship between the drawings developed from various view directions or the objects' locations in 3D space. Considerable human effort and intervention is required to place objects defined in the 2D drawings into 3D space. With the ability to provide information in each drawing defining a relationship with the other drawings as well as its place in 3D space, the objects defined in 2D drawings can self-assemble in 3D space, thereby reducing a substantial amount of required human effort.

30 Claims, 30 Drawing Sheets

AUTOMATED GENERATION OF 3D MODELS FROM 2D COMPUTER-AIDED DESIGN (CAD) DRAWINGS

CROSS-REFERENCE TO RELATED APPLICATIONS

The present disclosure claims priority to U.S. Provisional Patent Application No. 61/050,117, entitled "Automated generation of 3D models from 2D computer-aided design (CAD) drawings" filed May 2, 2008, which is incorporated herein by reference in its entirety for all purposes.

BACKGROUND

1. Technical Field

The disclosed embodiments relate generally to Computer-Aided Design (CAD) and, more specifically, to the process and method of automatically generating a 3-Dimensional model from one or more 2-Dimensional CAD drawings.

2. Background

When developing a 2D drawing, designers must visualize in their minds the structure they are trying to propose, and communicate the features and components of the structure to a fellow designer through a series of plans, elevations, side views, or planes in non-orthogonal view.

In 2D drawings, all views such as plan, elevation, and side view are drawn on the same plane. In other words, regardless of whether the view direction chosen describes a plan, an elevation or a side view, they are all described in the X-and-Y-axis plane of a 2D CAD drawing. When these individual views are drawn in an XY plane, the relationship of each drawing with respect to the other drawings, as well as the location of the defined 2D objects in 3-Dimensional space are completely lost. Substantial human effort is required to convert the individual drawings into a uniform 3D context to allow generation of a 3D model. Currently, applications allowing the generation of a 3D model from 2D CAD drawings with minimal human intervention are not commercially available.

2D CAD Drawings

According to structural engineering standards, a 2D CAD drawing comprises a hidden line, structure or "struct" line, and center line for portraying a 2D view of a 3D model. For example, struct lines 102 and hidden lines 104 are used to represent the outer diameter 106 and wall thickness 108 of a pipe 100 illustrated in FIG. 1. The section properties (outer diameter 106 and wall thickness 108) are provided parallel to the center line 110. The disclosed invention reads the properties and associates them with each center line. The section property of each member is defined relatively near to its center line on a separate layer. Layers are a way of managing, tidying and also controlling the visual layout of a drawing. Most of the leading CAD programs offer layering capabilities that enable the user to group specific data on different layers. This allows the user to organize data within a drawing, which makes it easier to retrieve the object information embedded within CAD drawings.

While defining a structural engineering drawing using a CAD program, each feature of the drawing is shown on different layers. Exemplary layers may include the hidden line layer, struct line layer, center line layer, and text layer. Additional layers, such as the complex layer, master layer, and the 3D-points layer, may also be included. Exemplary layers are defined herein.

Center Line Layer

The center line layer shows the center line 110 of each member in the drawing; it is basically the skeleton drawing of the model. The center line layer 110 is illustrated in FIG. 1.

Section Property Text Layer

The section property of each member is defined in the section property text layer. The section property may include the material information and section details. For example, with reference to FIG. 2, the following dimensions are defined:

Pipe 200=outer diameter 202*pipe thickness 204

$I$ Section 250=total depth 252*total width 254*flange thickness 256*web thickness 258

For the dimensions defined above in FIG. 2, FIG. 2(a) represents the section of pipe 200, and FIG. 2(b)b represents the "I section" 250. The section properties outer diameter 202 and pipe thickness 204 are provided for FIG. 2(a), and section properties height (depth) 252, width 254, flange thickness 256, and web thickness 258 are provided for FIG. 2(b). The disclosed invention reads the section properties and assigns them to their corresponding center line.

Struct Line and Hidden Line Layer

This layer contains all the struct lines 302 and hidden lines 304 of the drawing. Struct lines 302 and 312 and hidden lines 304 and 314 are used to determine if a member has variable section 312 or single section 302 properties. The member is considered simple 300 if the section property of the member does not vary, and complex 310 if the section property of the member does vary. FIG. 3(a) illustrates a simple member 300 and FIG. 3(b) illustrates a complex member 310.

Complex Layer

The complex layer 400 of FIG. 4 contains all the points of the member in which the section varies. The varying section property of the member is determined based on the complex points 402 specified at the point of variation 404 along the hidden line 406. This layer is used if the struct line and the hidden line are not present in the 2D drawing. The diagram presented in FIG. 4 illustrates a simple example of a complex joint with a point 402 located where the section properties 404 vary for a section of a pipe shown by struct line 408.

Master Layer

When a point is defined in a master layer 500, as in FIG. 5, a joint may be created on the structure. A joint 502 is located at the intersection of two or more center lines 504 and 506, as well as at the end of each center line. If a member splits, then the master joint should be specified where the member is split into multiple parts. An exemplary master joint 502 is illustrated in FIG. 5.

3D-Points Layer

The information provided in the 3D-points layer establishes the placement in 3D space of the objects defined in a drawing, and the relationship of the drawing to other drawings. The 3D points provide the position of a point on the X, Y, and Z axes in 3D space.

2D CAD drawings are typically represented in the format described herein. The material properties should be specified with a leader line, while section properties should be specified parallel to and near the center line, and in a separate layer. The leader line is a line with an arrow at one end, usually accompanied by text. It is used to represent the association of a text to an object. Limits are specified for considering text near the center line, and any text away from the limit is not considered text defining the section property. The text may be of the standard or non-standard (user-defined) format, wherein standard sections are documented in code book standards.

Gaps may be represented by providing an arc touching two lines with text near it specifying the gap value. 3D points should be specified in the 3D-points layer.

SUMMARY

The process and method for generating a 3D model from a set of 2D drawings is described herein. Traditionally, many structural components (objects) are communicated through a series of 2D drawings, wherein each drawing describes the components that are visible in a user-selected view direction, or "view". No machine-readable information in the drawings defines a relationship between the drawings developed from various view directions or the objects' locations in 3D space. Considerable human effort and intervention are required to place objects defined in the 2D drawings into 3D space. With the ability to provide information in each view defining a relationship with the other views in the drawing as well as its place in 3D space, the objects defined in 2D drawings can self-assemble in 3D space, thereby reducing a substantial amount of required human effort. A procedure is disclosed herein in which this defining information is inserted into the 2D CAD drawings, and used collectively with a disclosed computer application to automatically assemble data from individual 2D CAD drawings to generate a global 3D model in the physical coordinate system.

In one aspect, methods for converting the (X,Y) coordinates of a point in a 2D drawing to its corresponding (X,Y,Z) coordinates in 3D space are disclosed herein. In one embodiment, such a method may comprise selecting a 2D view in a CAD drawing of an object, and then receiving user-identified selections of three non-collinear control points in the 2D view. These control points represent relative orientation, scale and position with respect to each other in both the 2D view and a 3D global physical view of the object, and wherein the CAD drawing comprises (X,Y) coordinates for locations of all points in the 2D view. In addition, the method may include receiving user-input (X,Y,Z) coordinates of the three control points in the 3D global physical view corresponding to the (X,Y) coordinates of the three control points in the 2D view. Computing a coordinate transformation matrix for the 2D view may then occur, wherein the coordinate transformation matrix comprises an orientation and scale matrix (R) containing orientation and scale of the three control points in the 2D view, and a position matrix (T) containing positions of the three control points with respect to the 3D global physical view, based on the (X,Y) and (X,Y,Z) coordinates of the three control points. Also, such a method may then include automatically converting (X,Y) coordinates of remaining points in the 2D view into corresponding (X,Y,Z) coordinates of those remaining points in the 3D global physical view using the coordinate transformation matrix. Based on the above, an exemplary method may thus include generating, in the 3D global physical view, a 3D model of the object using the (X,Y,Z) coordinates of the control points and the remaining points.

BRIEF DESCRIPTION OF THE DRAWINGS

Embodiments are illustrated by way of example in the accompanying figures, in which like reference numbers indicate similar parts, and in which.

DETAILED DESCRIPTION

Manual 3D Model Assembly

Figure 1:
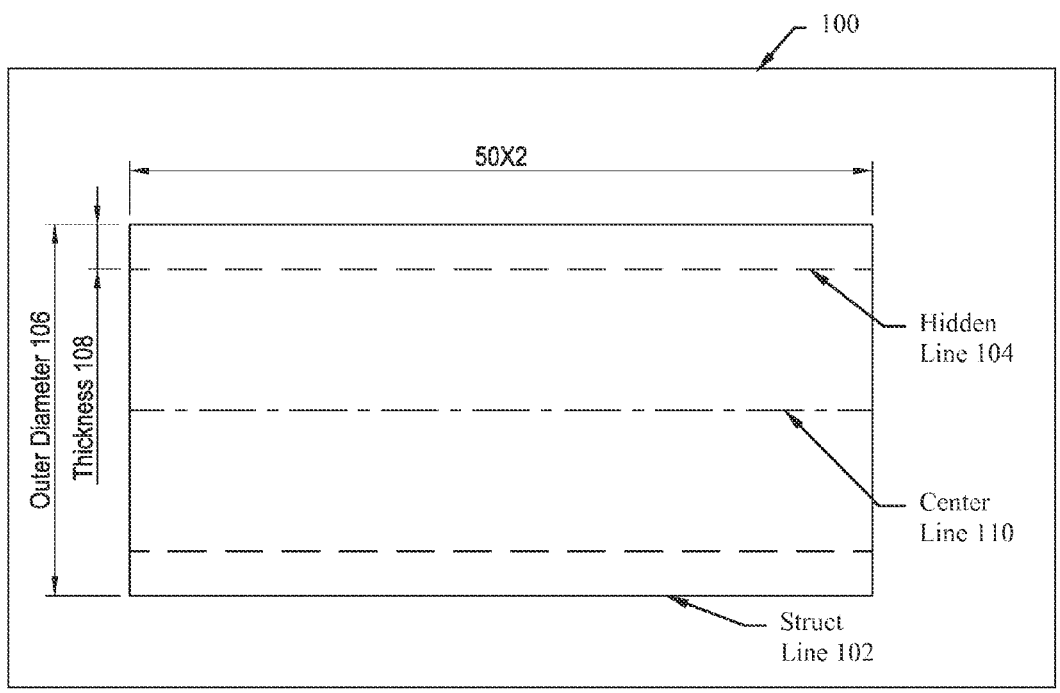
FIG. 1 is an exemplary 2D CAD drawing of a hollow circular pipe.
Figure 2:
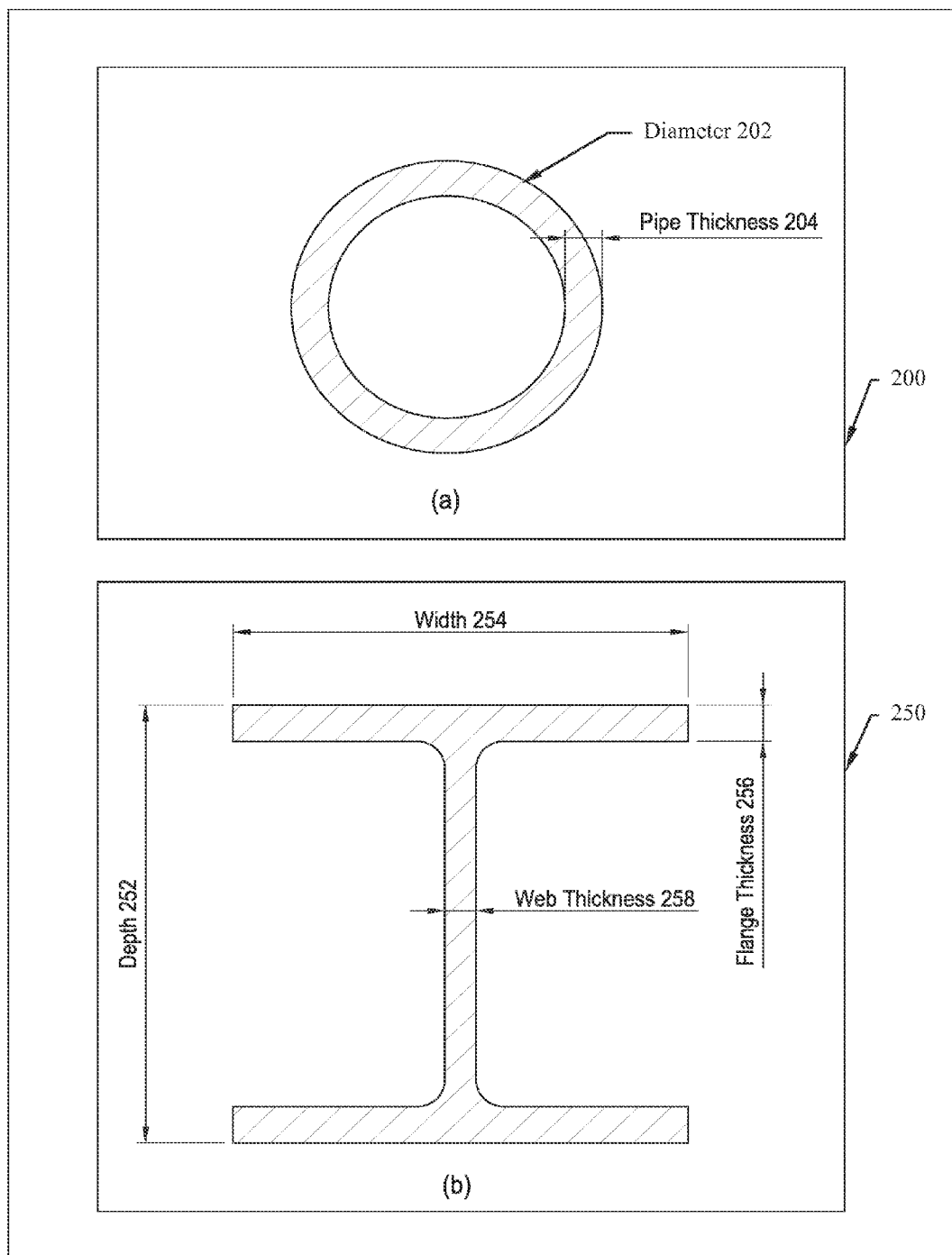
FIG. 2 illustrates an exemplary cross-section of a pipe similar to that illustrated in FIG. 1, and an exemplary cross-section of an I-shaped flange.
Figure 3:
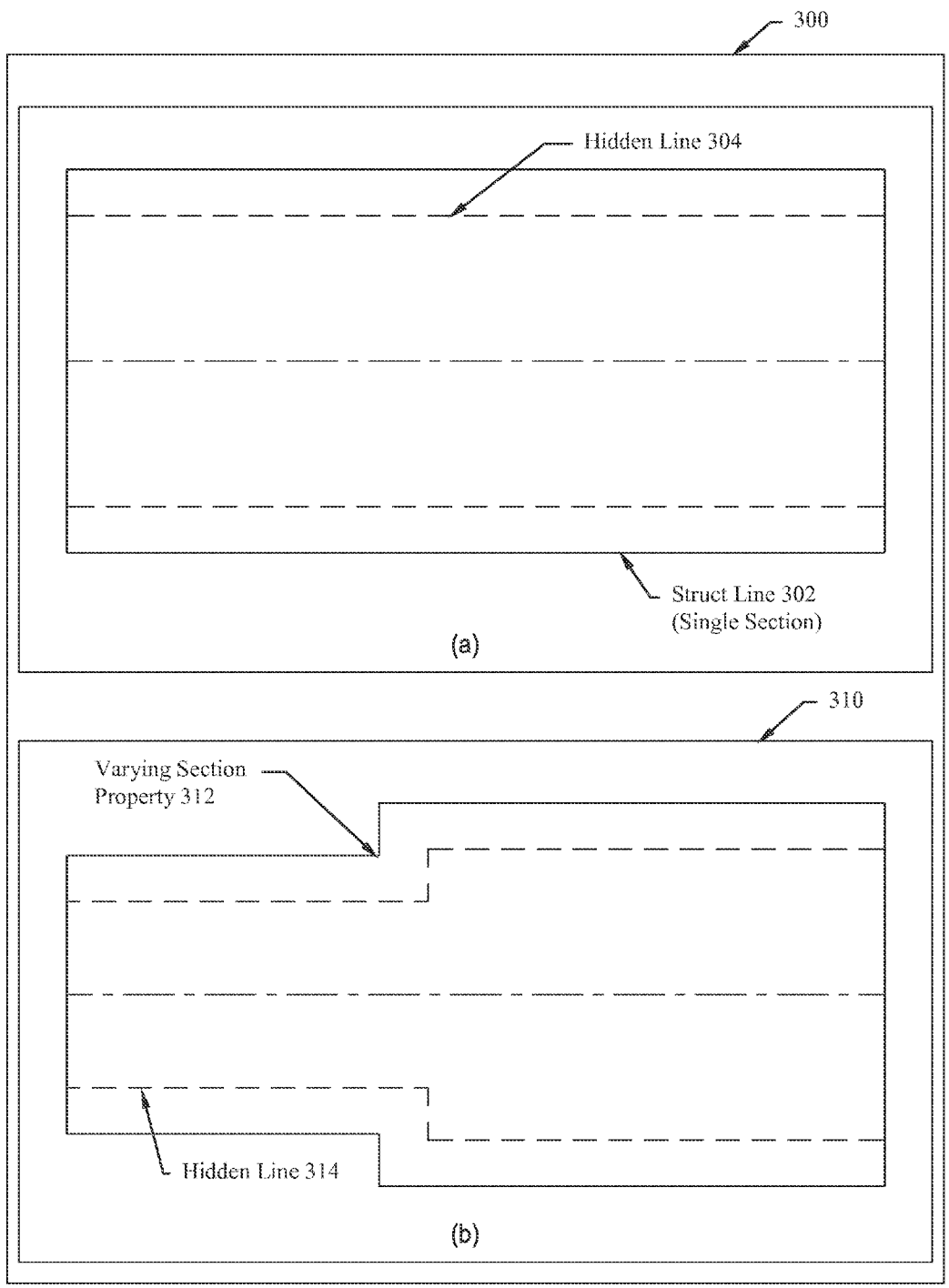
FIG. 3 illustrates exemplary simple and complex members of a pipe.
Figure 4:
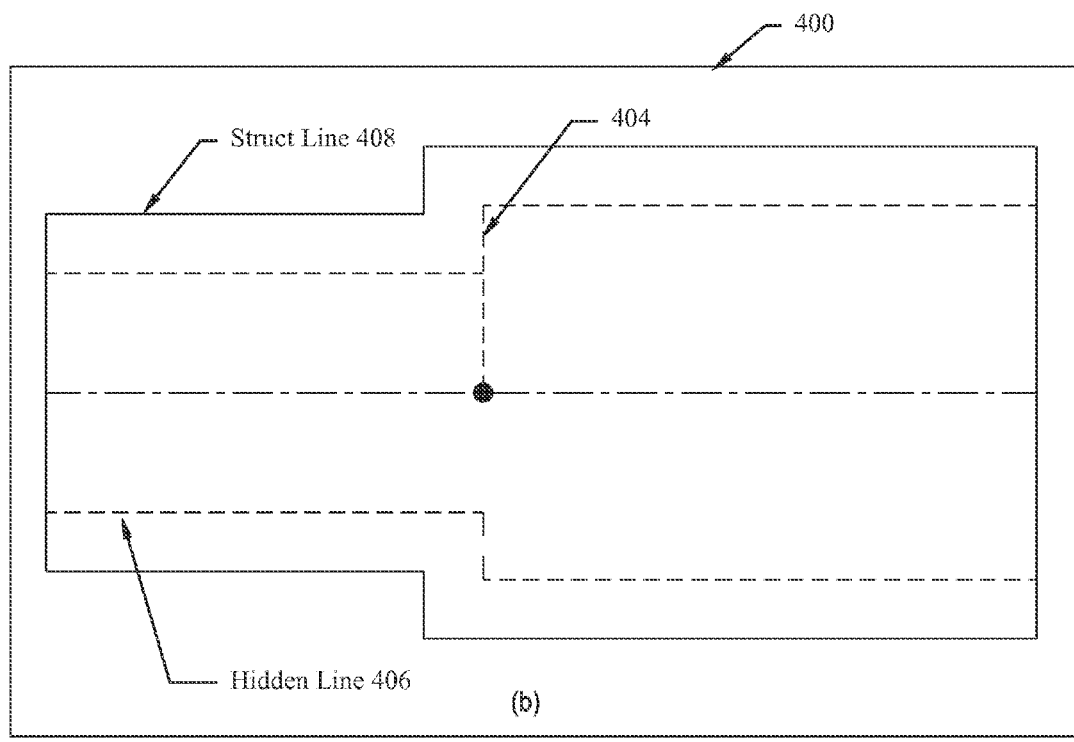
FIG. 4 illustrates an exemplary complex joint with a point located where the section properties vary for a section of a pipe.
Figure 5:
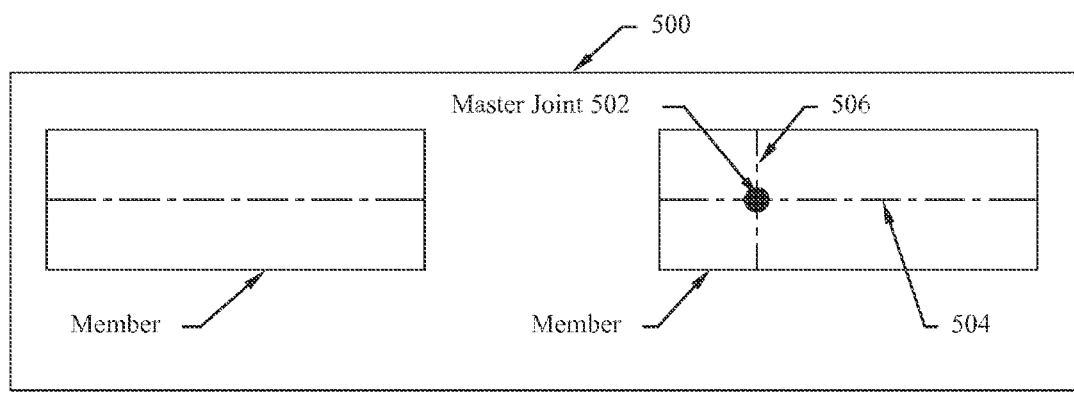
FIG. 5 illustrates an exemplary member with a master joint.
Figure 6:
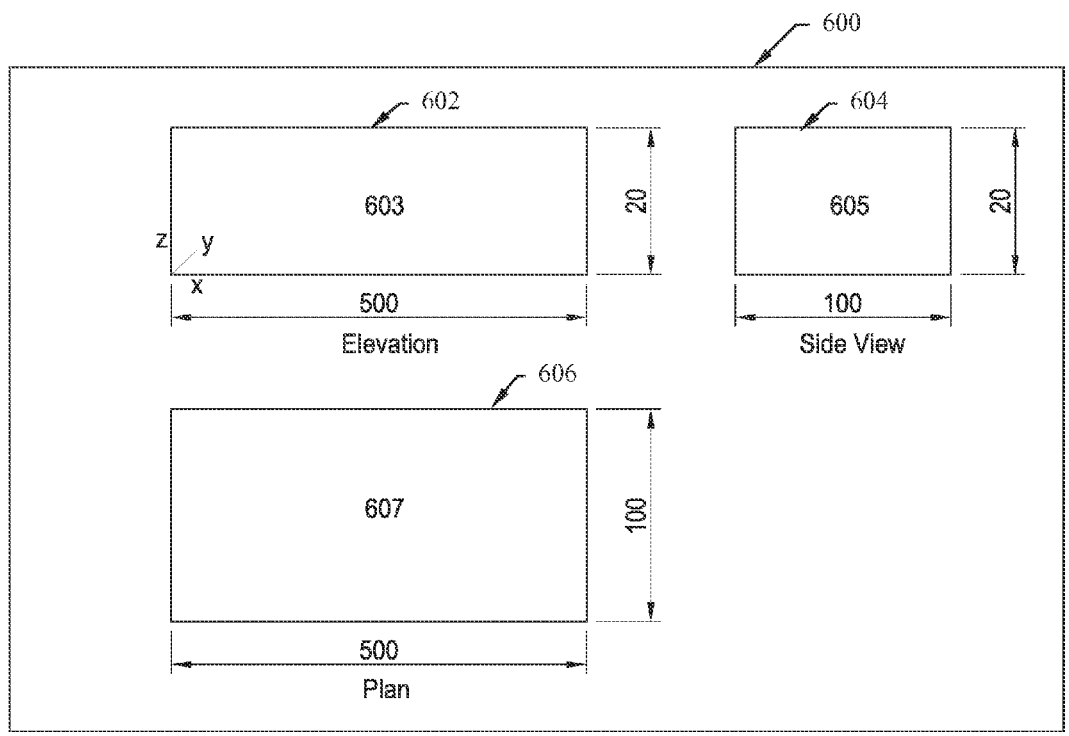
FIG. 6 illustrates views of an exemplary box as shown in a 2D CAD drawing.
Figure 7:
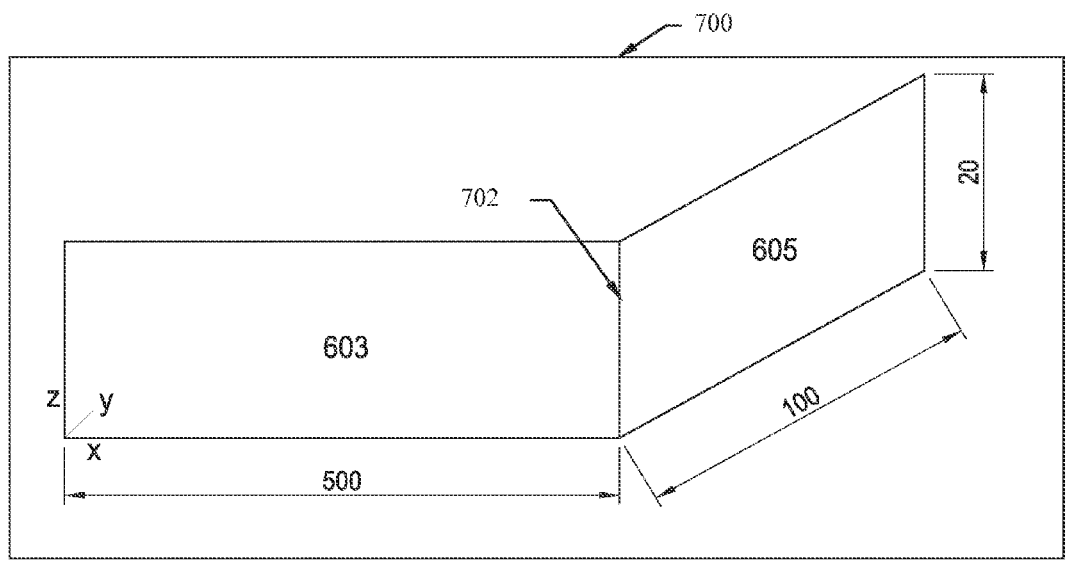
FIG. 7 illustrates the assembly of exemplary box drawings from information gathered from the elevation and side view drawings of FIG. 6.
Figure 8:
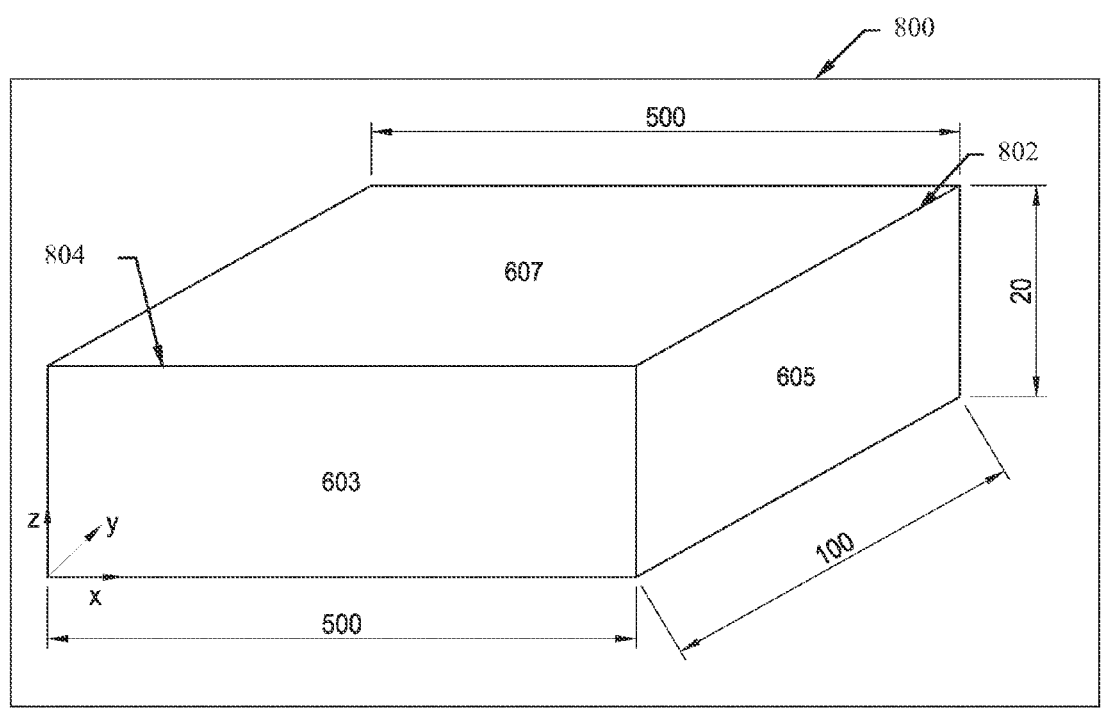
FIG. 8 illustrates an exemplary 3D model of a box generated using 2D CAD views.

FIGS. 6-8 collectively represent the construction of a 3D model of a box using typically defined CAD drawings. The views illustrate how the information from the three drawings in the figures should be assembled to understand and "build" the intended structure.

FIG. 6 presents views of an exemplary box as shown in a 2D CAD drawing 600. The two-dimensional views presented are elevation view 602, side view 604, and plan view 606; wherein the elevation view 602 profiles the box's width (500) and height (20) by measuring its front/back 603, the side view 604 profiles the box's length (100) and height (20) by measuring its side 605, and the plan view 606 profiles the box's width (500) and length (100) by measuring its top/bottom 607.

FIG. 7 illustrates partial assembly 700 of the exemplary box drawings 600 from information such as the box width, length and height, gathered from the elevation 602 and side view 604 drawings. In order to produce the drawing 700 in FIG. 7, a designer must view the elevation 602 and side view 604 drawings in FIG. 6, and manually "assemble" the drawings in relation to each other based on the measurements and orientation of the boxes in the elevation 602 and side view 604 drawings. For example, because the box front/back 603 and box side 605 share the same height measurement (20), the designer may assume that the drawings are supposed to be positioned to share the same edge 702 as illustrated in FIG. 7. This process is completely dependent upon the competence of the designer, and his or her interpretation of the drawings 600. In simple drawings, this does not present a major problem, but as drawings become more complicated, with many parts coincidentally having the same measurements, the assembly process may quickly become very confusing and burdensome for the designer.

FIG. 8 illustrates the completed assembly 800 of the exemplary 3D box using the 2D CAD views 600 in FIG. 6. To produce the 3D object 800 in FIG. 8, a designer must view the plan view 606 of FIG. 6 in combination with the partially assembled box 700 in FIG. 7. As with the partially assembled box 700 in FIG. 7, the designer must use his or her own judgment regarding the orientation of the 2D drawings to manually assemble the pieces to create the final 3D object 800. In this example, the designer had to view the plan view 606 and identify which edge measurements matched the corresponding edges of the partially assembled box 700. Because the length measurement (100) of the plan view 607 matches the length measurement of the side view drawing 605, the designer can determine that the two views connect to form edge 802 in FIG. 8. Similarly, because the width measurement (500) of the plan view 607 matches the width measurement of the side view drawing 605, the designer can determine that the two views connect to form edge 804. As demonstrated with the box example, there is very little information in the CAD drawings to assist the assembly process, requiring most of the work to be performed by the designer.

Procedure

Figure 9:
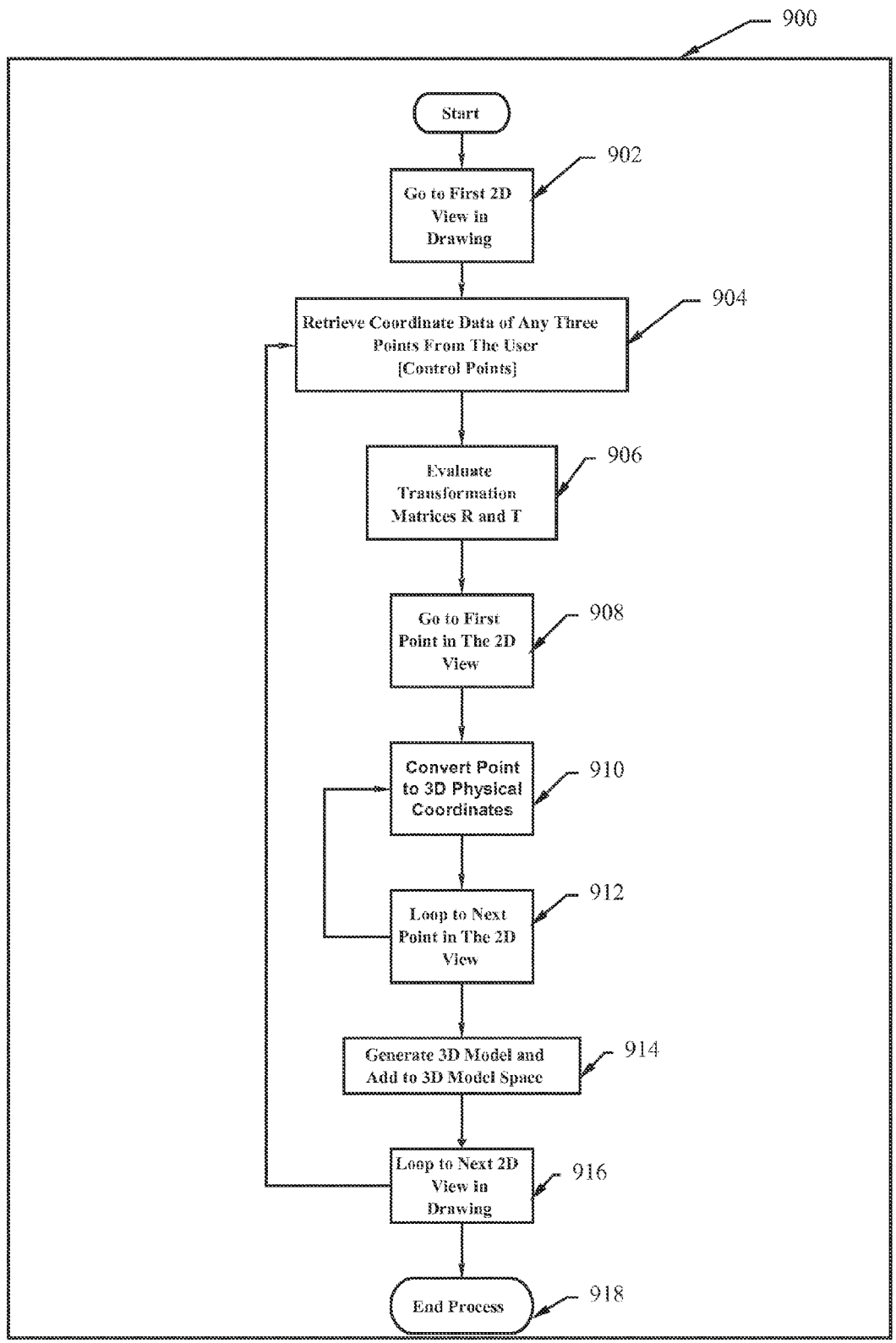
FIG. 9 is a flow chart providing a procedure for automatic generation of 3D models from 2D CAD drawings.

A step-by-step procedure 900 for automatic generation of 3D models from 2D CAD drawings is presented in FIG. 9. The flow chart 900 provides an overview of the procedure performed by the disclosed system. It should be understood that certain steps that may be used to facilitate the illustrated are may be omitted from the description for simplicity.

The process begins by selecting the first 2D view in a CAD drawing 902. For the view it identifies, the processor retrieves the coordinate data of any three control points as defined by the user 904. In this step 904, the user defines not only which points in the 2D drawing will be the control points, but also the 3D global physical coordinates of those three control points. It is worth noting that there are no particular points in the 2D drawing that are called "control points"; the control points are simply the points in the 2D drawing whose 3D physical coordinates are provided by the user. In the next step 906, the processor then evaluates the R and T transformation matrices using data from the previous step 904 incorporated with formulas presented hereinafter. Once the R and T matrices have been evaluated 906, all points in the view can be converted to their 3D physical coordinates.

To convert the points and create the 3D model, the processor selects the first point in the 2D view 908. The processor then converts the identified point into its 3D physical coordinate 910, and then loops to the next point in the view 912. The conversion process 910 is repeated for this next point, and continues to repeat until all points in the 2D view have been converted. Since each point in the 2D view now has an associated 3D point, the components shown in the 2D view can be drawn in the 3D model using the connectivity in the 2D view. Once all the points in the 2D view have been converted into their 3D physical coordinates, the processor generates the 3D model of the view, and adds it to the 3D model space 914.

If there are more views to be converted, then the processor loops to the next 2D view in the drawing 916, wherein the process repeats, and retrieves from the user the 3D physical coordinates of the next three points 904. Once all the views in all the 2D drawings have been generated into a 3D model and added to the 3D model space, the process ends 918.

Figure 10:
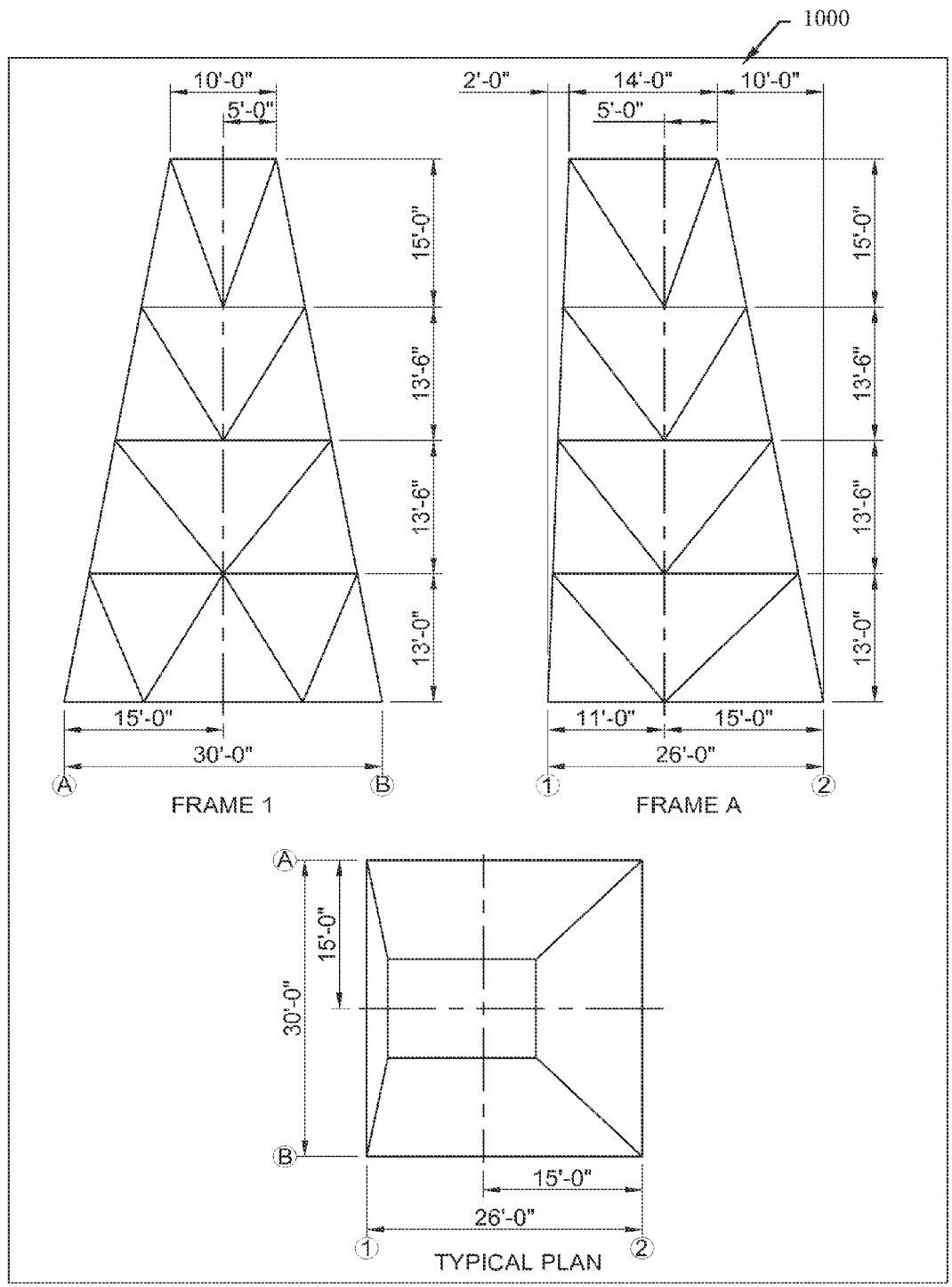
FIG. 10 illustrates a hardcopy of a CAD drawing of a typical frame structure.
Figure 11:
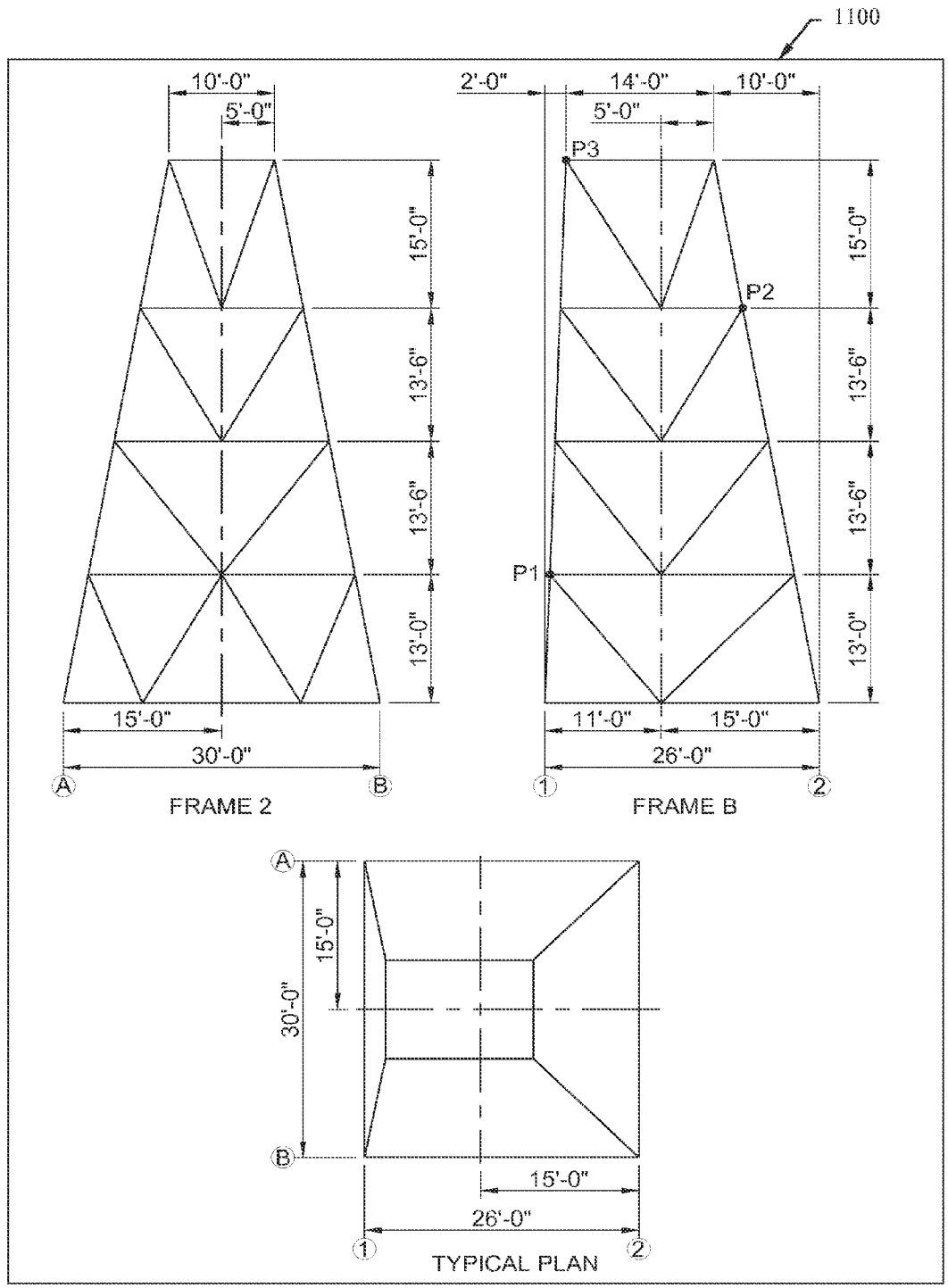
FIG. 11 illustrates a hardcopy of a CAD drawing of a typical frame structure.
Figure 12:
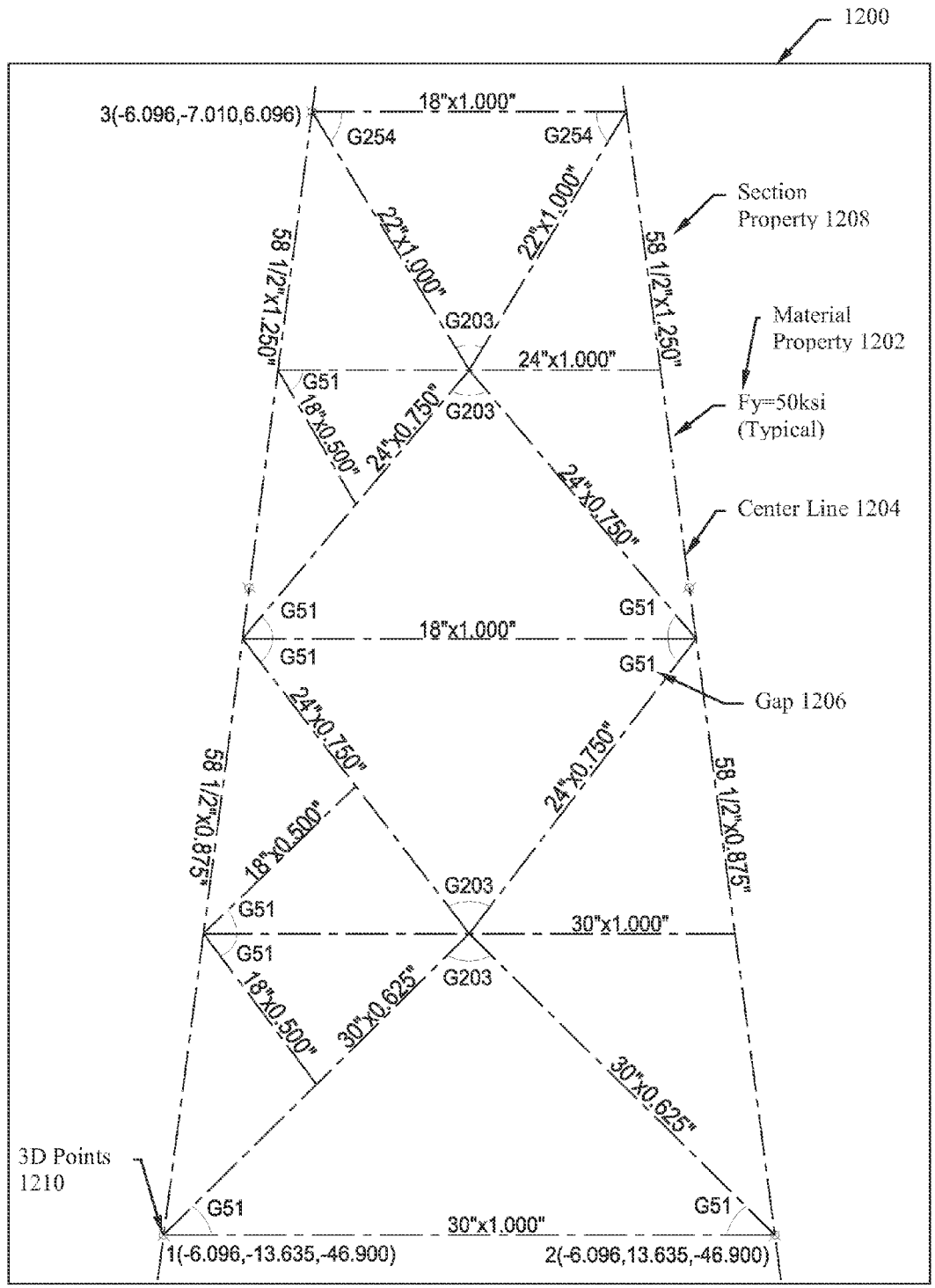
FIG. 12 illustrates a centerline drawing of a typical row of an exemplary jacket structure.

The working concept for all steps except the model generation step 914 of the proposed procedure 900 is further explained and illustrated using the series of slightly complicated structures 1000, 1100 and 1200 in FIGS. 10, 11, and 12, respectively. The details of typical hardcopy versions of a 2D CAD drawing featuring a frame structure are shown in FIGS. 10 and 11. FIG. 10 illustrates a CAD drawing 1000 of a typical frame structure with elevation view Frame 1, side view Frame A, and plan view Typical Plan. FIG. 11 illustrates a CAD drawing 1100 of a typical frame structure with elevation view Frame 2, side view Frame B, and plan view Typical Plan. Frame 1, Frame 2, Frame A, Frame B, and Typical Plan may be combined to form a 3D frame structure. FIGS. 10 and 11 contain measurements of the frame structure in each view; however, the 2D drawings 1000 and 1100 themselves do not contain any information regarding the frame structure position and orientation with respect to the 3D physical world. Disclosed is a procedure in which this positioning data is inserted into the 2D CAD drawings, in addition to an application which uses this data to automatically assemble information from individual 2D CAD drawings to generate a global 3D model in the physical coordinate system.

Select 2D View

As presented in FIG. 9, the first step 902 in the model generation process is to locate the first 2D view in the CAD drawing. In this step, the user manually selects the first view to be converted using a selection window tool. For the view selected, the processor retrieves the coordinate data of any three control points as defined by the user 904. The drawings in the session may be provided by various CAD programs through standardized document exchange formats. This provides for the flexibility and adaptability of the disclosed system for use with various CAD programs.

While defining a structural engineering drawing using a CAD program, each feature of the drawing is shown on different layers. Exemplary layers may include the hidden line layer, struct line layer, center line layer, and text layer. The disclosed system preferably includes the exemplary layers as well as additional layers such as the complex layer, master layer, and the 3D-points layer to be present in the 2D drawings.

The section property of each member, or object, in a drawing is defined relatively near to its center line on a separate layer. The disclosed system reads the section properties on each layer of the 2D CAD drawing, and associates them with each center line. Grouping specific data on different layers allows the user to organize data within a drawing, which makes it easier to retrieve the object information embedded within CAD drawings.

Retrieve Coordinate Data

The second step 904 in the model generation process is to retrieve the coordinate data of any three points from the user. The points identified by the user correspond to the three control points. In this step 904, the user defines not only which points in the 2D drawing will be the control points, but also the 3D global physical coordinates of those three control points. The user manually selects the points from the view, and then inserts the 3D coordinates of the control points in the "3D-Points Layer" discussed above.

To accurately convert a 2D drawing into a 3D model, the coordinates of the 2D drawing must be converted into their corresponding 3D coordinates. This allows the computer or designer to build a 3D model with the proper drawing relationships and locations in 3D space. 2D CAD drawings comprise a collection of points along an XY axis, wherein every point in a drawing corresponds to a value on the X-axis, and a value on the Y-axis. The XY value is considered the coordinate, or location of a point. Conversion of a point from 2D drawing space into the 3D physical space involves translational, rotational, and scale transformations of the coordinates. To convert a point in the 2D drawing space into a point in the 3D physical space, the following information is typically required:

1. Coordinates of any three non-collinear points (control points) lying in the drawing plane, in which the points are represented in both:
   a) the 3D global physical system; and
   b) the 2D drawing system.
2. Coordinates in the 2D drawing space of the point for conversion.

Information in item (1) above defines the relative orientation, position, and scale of the two systems (2D drawing and 3D physical) with respect to each other. Information in item (2) defines the local coordinates, or location, in the 2D drawing of the point to be converted. Different scales along the two axes of the 2D drawing space are automatically accounted for in the disclosed formulation. In general, the scale in the X and Y direction of a 2D drawing are the same. However, frames that are slightly inclined in a vertical plane are usually drawn by projecting onto the vertical plane. In that case, the drawing has different scales in the two directions of the drawing (X and Y). The disclosed procedure accounts for the possibility of different scales for the X and Y axes.

In reference to FIG. 11, points $P_1$, $P_2$, and $P_3$ represent the three control points for the Frame B view, in accordance with item (1) as described above. A minimum of three points are typically required to fully convert a 2D view into a 3D physical space. It should be noted that the user specifies the points to be designated control points for each view in a series of drawings, i.e., each view in a 2D CAD drawing has its own set of control points, wherein the control points are defined by the user. Vectors of size 3×1 will represent the global physical coordinates (1a) of the three control points; wherein the vectors $(X_{g1}, Y_{g1}, Z_{g1})$, $(X_{g2}, Y_{g2}, Z_{g2})$, and $(X_{g3}, Y_{g3}, Z_{g3})$ represent the global physical coordinates of control points $P_1$, $P_2$, and $P_3$, respectively, as defined by the user. The values of the 3D global physical coordinates of the control points are input by the user, while the 2D coordinates of all the points (including the control points) are embedded in the 2D drawings.

$$\text{Global Physical coordinates of control points} \Rightarrow \begin{Bmatrix} X_{g1} \\ Y_{g1} \\ Z_{g1} \end{Bmatrix}, \quad (1a)$$

$$\begin{Bmatrix} X_{g2} \\ Y_{g2} \\ Z_{g2} \end{Bmatrix}, \begin{Bmatrix} X_{g3} \\ Y_{g3} \\ Z_{g3} \end{Bmatrix}$$

Additionally, vectors of size 2×1 will represent the 2D drawing coordinates (1b) of the three control points; wherein the vectors $(X_{d1}, Y_{d1})$, $(X_{d2}, Y_{d2})$, and $(X_{d3}, Y_{d3})$ represent the 2D drawing coordinates of control points $P_1$, $P_2$, and $P_3$, respectively. The numerical values of the 2D drawing coordinates for the control points may be found in the 2D drawing when the drawing is opened in the CAD program, i.e., the 2D coordinates of all the points (including the control points) are embedded in the 2D drawings. As illustrated by FIGS. 10 and 11, the coordinate values of the points are not typically displayed on the hardcopy of the drawings.

$$2D \text{ drawing coordinates of control points} \Rightarrow \begin{Bmatrix} X_{d1} \\ Y_{d1} \end{Bmatrix}, \quad (1b)$$

$$\begin{Bmatrix} X_{d2} \\ Y_{d2} \end{Bmatrix}, \begin{Bmatrix} X_{d3} \\ Y_{d3} \end{Bmatrix}$$

It is not necessary for the user to know the 2D coordinates of any joint in the views. The disclosed system combines the 3D coordinates entered by the user with the 2D coordinates obtained from the CAD database internally, to obtain transformation matrices R and T. The disclosed system then reads the 2D coordinates from the CAD database, and converts the points to their corresponding 3D points using the R and T matrices.

Evaluate Matrices

For a particular view selected by the disclosed system, matrices R and T are computed as described herein. By analyzing the control point coordinates (1), in both the 3D physical and 2D drawing systems, and the local coordinates (2) of the point under consideration, it is possible to obtain the 3D physical coordinates of any arbitrary point in the 2D plane. For example, arbitrary point A is represented by its 2D drawing coordinates $(X_{da}, Y_{da})$. The global coordinates of A $(X_{ga}, Y_{ga}, Z_{ga})$ are computed using the following expression:

$$\begin{Bmatrix} X_{ga} \\ Y_{ga} \\ Z_{ga} \end{Bmatrix} = \{T\}_{3 \times 1} + [R]_{3 \times 2} \begin{Bmatrix} X_{da} \\ Y_{da} \end{Bmatrix}$$

Where matrices R and T are given by the following expressions:

$$R = \begin{bmatrix} X_{g2} - X_{g1} & X_{g3} - X_{g1} \\ Y_{g2} - Y_{g1} & Y_{g3} - Y_{g1} \\ Z_{g2} - Z_{g1} & Z_{g3} - Z_{g1} \end{bmatrix} \begin{bmatrix} X_{d2} - X_{d1} & X_{d3} - X_{d1} \\ Y_{d2} - Y_{d1} & Y_{d3} - Y_{d1} \end{bmatrix}^{-1}$$

$$T = \begin{Bmatrix} X_{g1} \\ Y_{g1} \\ Z_{g1} \end{Bmatrix} - [R] \begin{Bmatrix} X_{d1} \\ Y_{d1} \end{Bmatrix}$$

Matrix R contains the orientation and scale of the drawing, and matrix T contains the position of the drawing with respect to the 3D physical space. These matrices may be evaluated once for a particular view. Once the matrices are computed, all the remaining points in the drawing may be converted into a 3D physical coordinate system. Because any arbitrary point can now be determined and converted into a 3D physical system, the task may be automated, thus reducing human intervention in the conversion process.

Select Point in 2D View

To convert the points and create the 3D model, the processor selects the first point in the 2D view 908. The CAD database stores all the information needed for complete definition of the geometry in all the drawings. For example, a first line may be stored in the CAD database as the 2D coordinates of the first line's two endpoints. Using the information in the database, the disclosed system can determine the location of all other lines in the view, and compute the 2D coordinates of all the intersections that would occur along the first line. Thus, when a user selects a view to convert, the disclosed system computes the total number of points in the view (endpoints and intersections). A first point is selected by the disclosed system, and the conversion step 910 begins. It is worth noting that it is possible that a continuous member in a first view is intersected by an out-of-plane member, or member from a second view. The disclosed system considers these intersections, and uses them to configure the 3D model of the respective views.

3D Conversion

As previously described, all 2D CAD drawings are drawn in the XY plane. As such, the (X, Y) coordinates of any specific point may be obtained directly from the drawing database. The primary challenge is to convert the (X, Y) coordinates of any point in the drawing to its corresponding (X, Y, Z) coordinates in 3D space. For each point that the system finds, it reads the 2D drawing coordinates embedded in the CAD database, and computes the 3D physical coordinates for that point using previously defined matrices R and T.

The conversion task, as previously presented, is accomplished by selecting three non-collinear points in the drawing, and assigning the (X, Y, Z) coordinates represented by the three points in 3D space. A plane represented by the three (X, Y, Z) coordinates may be determined, and a coordinate transformation matrix is developed to convert all other (X, Y) points represented in the drawing into their corresponding (X, Y, Z) points in 3D space. The detailed mathematical procedure for accomplishing this is previously described in the "Evaluate Matrices" section above.

The disclosed system automatically recognizes the section properties in the 2D drawing and relates them to the corresponding center line. At the intersection of center lines and center line end points, joints are formed, as illustrated in FIG. 12. FIG. 12 presents a typical center line drawing of a typical row 1200 of an exemplary jacket structure. The material properties 1202, center line 1204, gap layer 1206, section properties 1208, and 3D points layer 1210 are illustrated in the drawing. The intersection points and the end points are converted to their corresponding 3D coordinates using the transformation matrix. If there is more than one joint within a specified tolerance limit, the joints merge together to form a master joint. Each joint, intersection point, and end point of the center line corresponds to the 2D points that are to be converted by the disclosed system. For each 2D point determined in the drawing, the corresponding 3D (X, Y, Z) coordinates are calculated and stored in the disclosed system until the entire 3D model of the view is generated.

Loop to Next Point in 2D View

After computing matrices R and T for a particular view, the disclosed system then loops over all the points in said view. For each point that the system selects while looping, the system reads the 2D drawing coordinates embedded in the CAD database, and computes the 3D physical coordinates for that point. As previously discussed, the disclosed system knows how many points are in each view, and continues to loop through all the points until every point is converted.

3D Model Generation

Once the 3D coordinates are determined for each point in a view, the 3D model of the view is generated in the 3D space. The process of automated generation of a 3D model from 2D CAD drawings for an exemplary jacket structure is presented herein. FIGS. 13-33 are incorporated herein for the sole purpose of illustrating only the "generate 3D model and add to 3D model space" step 914 of FIG. 9, and should not be considered illustration of any other steps in FIG. 9.

Description of Generation Process

Figure 13:
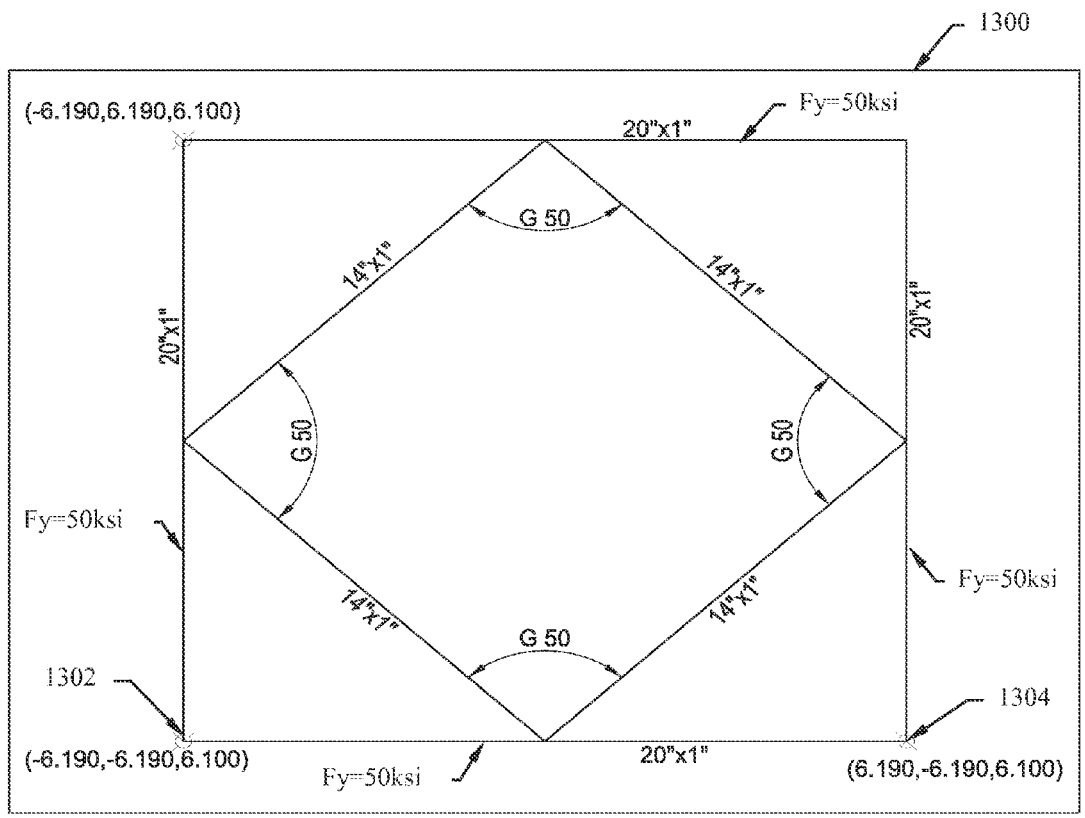
FIG. 13 illustrates a 2D CAD drawing of a typical horizontal frame of an exemplary jacket structure.
Figure 14:
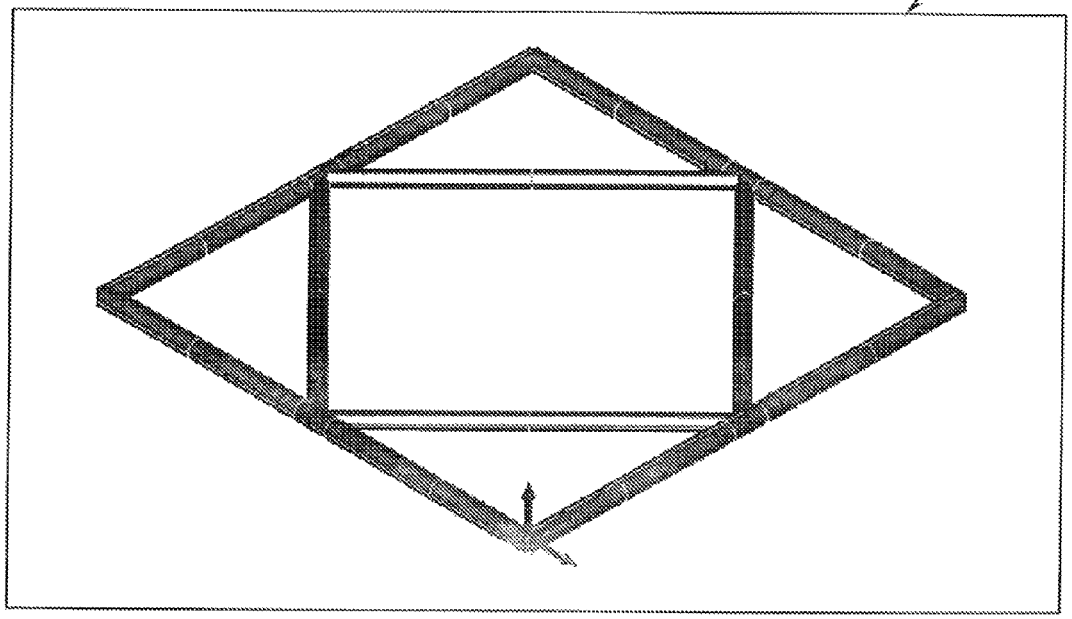
FIG. 14 illustrates the 3D view of a model generated from the objects defined in FIG. 13.

FIG. 13 illustrates a 2D CAD drawing of a typical horizontal frame 1300 of an exemplary jacket structure, featuring three control points and their respective 3D global physical coordinates. It is worth noting that the 2D CAD drawings, such as that illustrated in FIG. 13, may be provided by various CAD programs through standardized document exchange formats. The first control point 1302 has 3D coordinates (−6.190, −6.190, 6.100), the second control point 1304 has 3D coordinates (6.190, −6.190, 6.100), and the third control point has coordinates (−6.190, 6.190, 6.100). As presently disclosed, this data is incorporated with the procedure described in FIG. 9 to generate a 3D model. Once the 3D global physical coordinates of all the points are defined, the model of the selected view is generated and placed in the 3D model space. FIG. 14 illustrates the 3D model 1400 of the horizontal frame 1300 generated from the objects defined in the 2D drawing shown in FIG. 13.

The disclosed technique used by the system to convert the 2D drawing in FIG. 13 to the 3D model in FIG. 14 is further illustrated by the conversion of the 2D CAD drawings in the following figures into their respective 3D model space. The sequential assembling of an exemplary 3D jacket structure model from 2D drawings is illustrated in FIGS. 15-33;

wherein the first object in each figure is a view in a 2D CAD drawing, and the second object in each figure is the 3D model space with the inclusion of the 3D model of the 2D view shown in the first object. For example, the first object 1500 in FIG. 15 illustrates a view of an elevation deck 1502 in a 2D CAD drawing, and the second object 1550, illustrates the 3D model space 1510 showing the 3D model 1504 of the elevation deck 1502.

Figure 16:
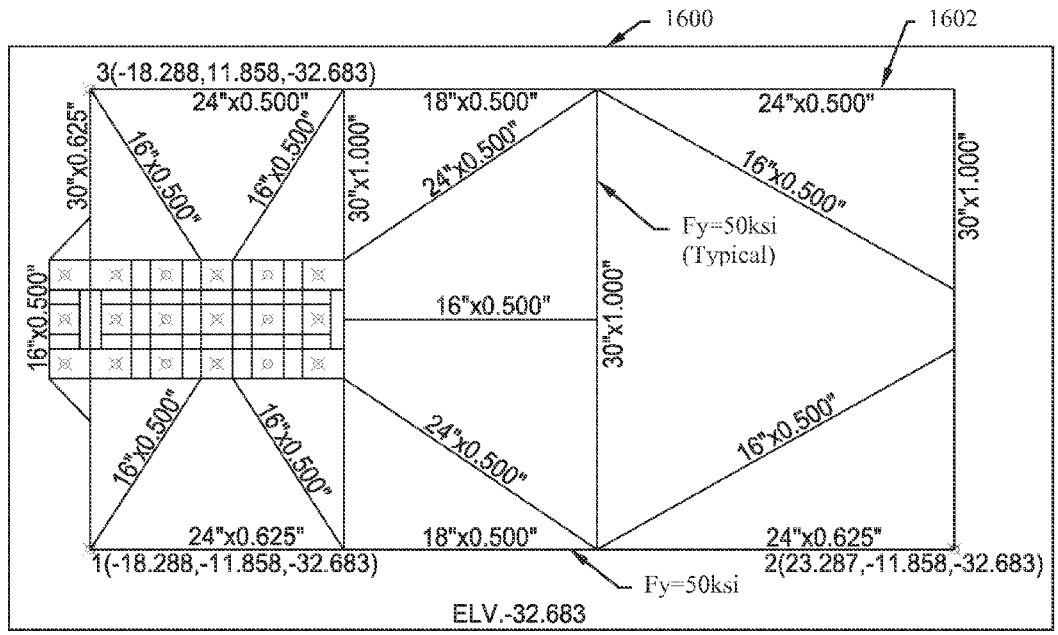
FIG. 16 illustrates a 2D drawing of a section of an exemplary jacket structure, and its 3D model applied to the jacket structure model.
Figure 16:
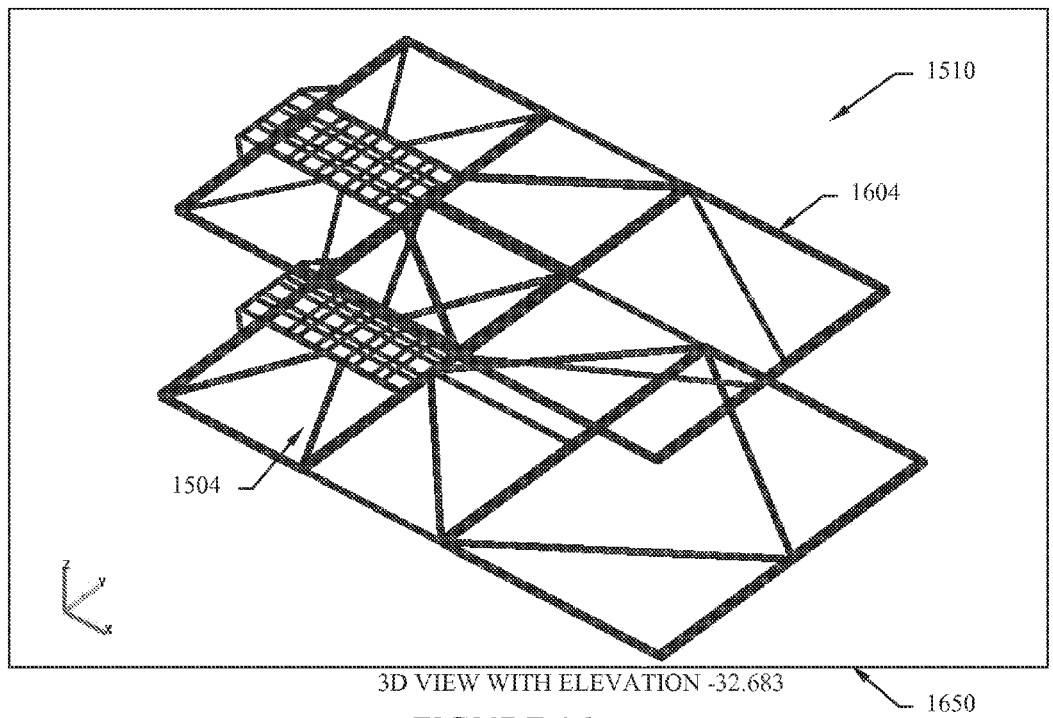
Figure 17:
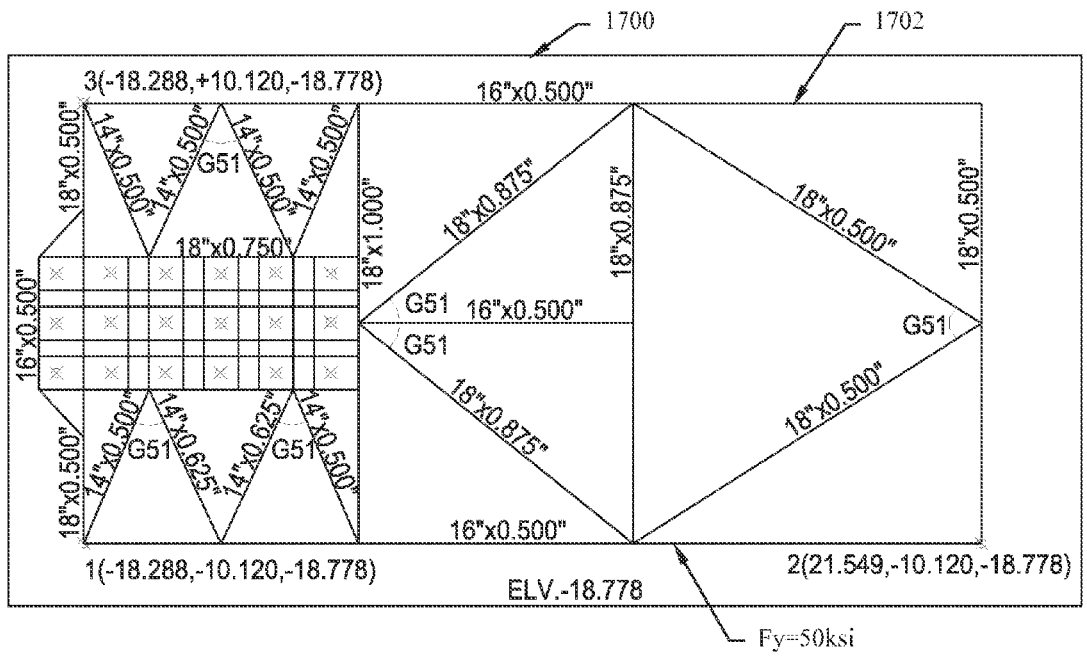
FIG. 17 illustrates a 2D drawing of a section of an exemplary jacket structure, and its 3D model applied to the jacket structure model.
Figure 17:
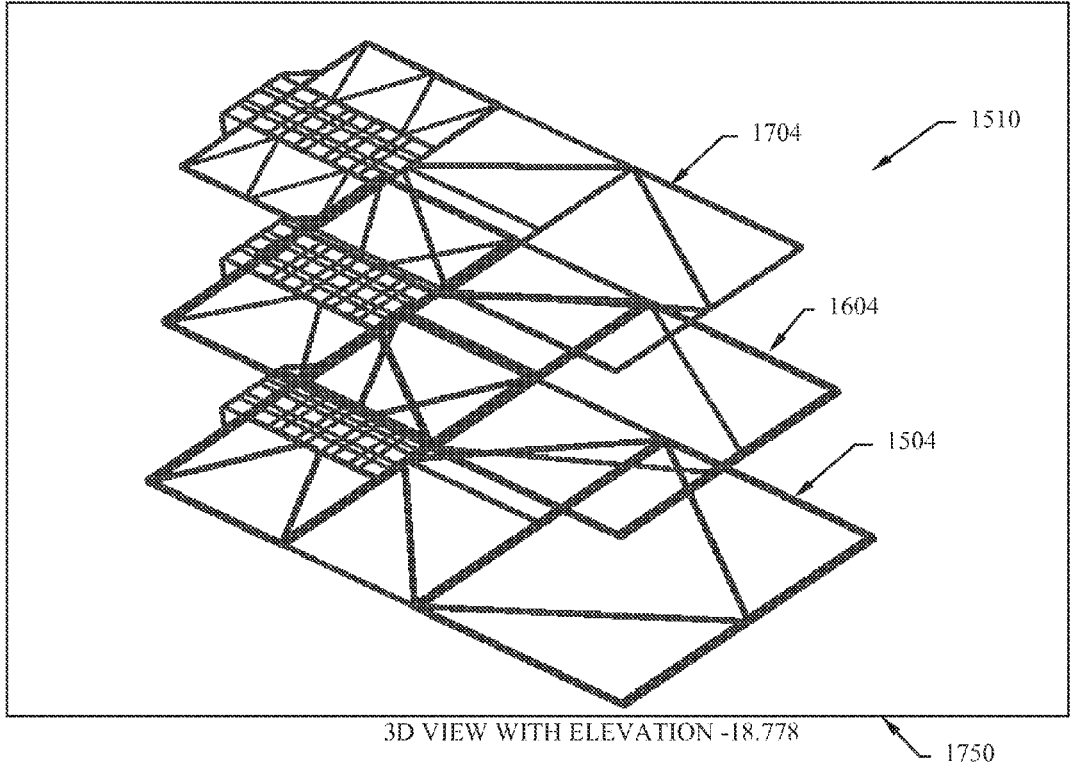
Figure 18:
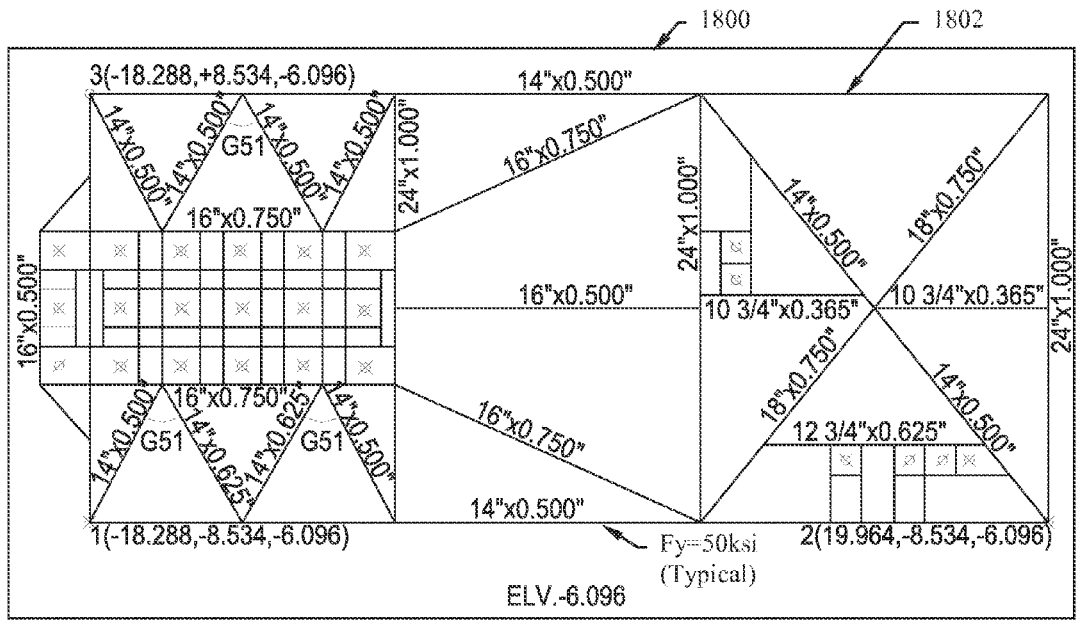
FIG. 18 illustrates a 2D drawing of a section of an exemplary jacket structure, and its 3D model applied to the jacket structure model.
Figure 18:
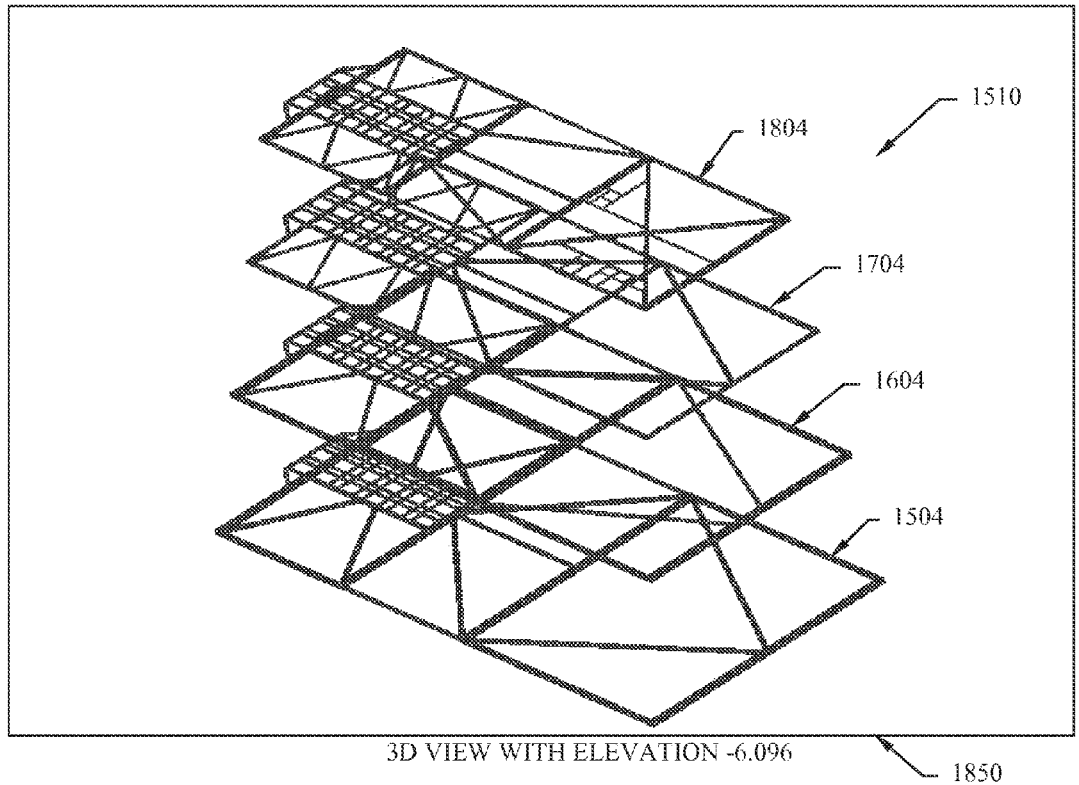
Figure 19:
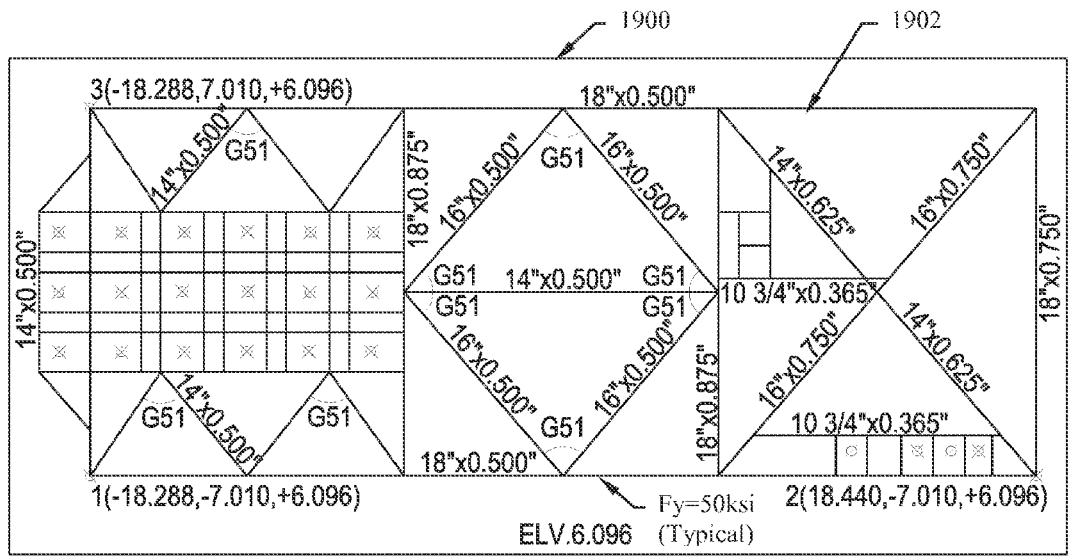
FIG. 19 illustrates a 2D drawing of a section of an exemplary jacket structure, and its 3D model applied to the jacket structure model.
Figure 19:
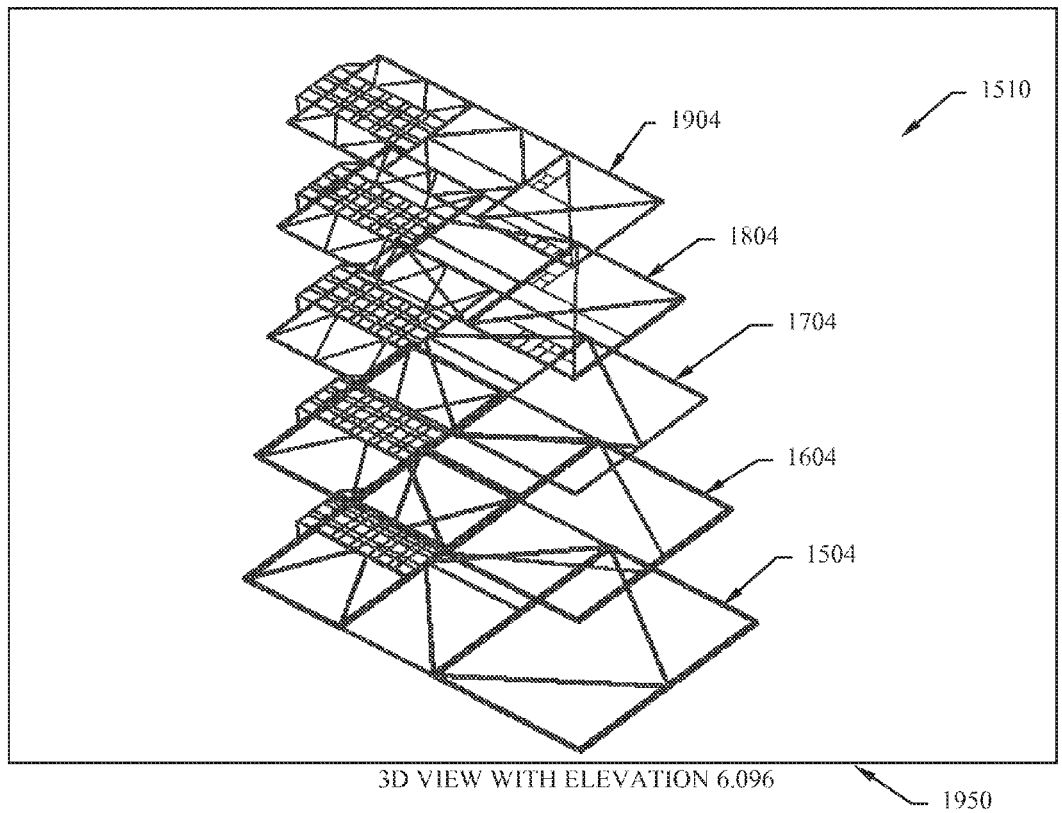
Figure 20:
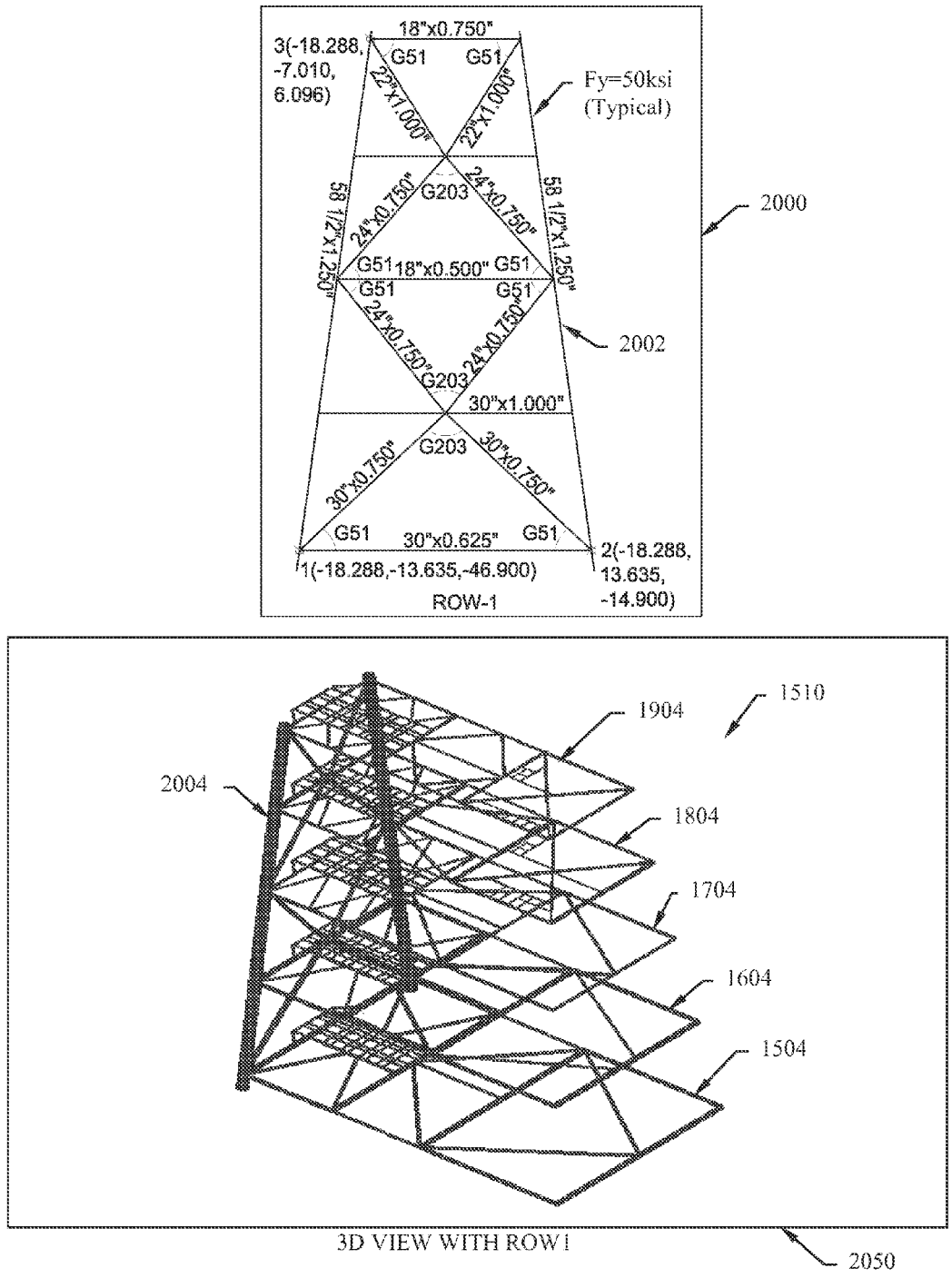
FIG. 20 illustrates a 2D drawing of a section of an exemplary jacket structure, and its 3D model applied to the jacket structure model.
Figure 21:
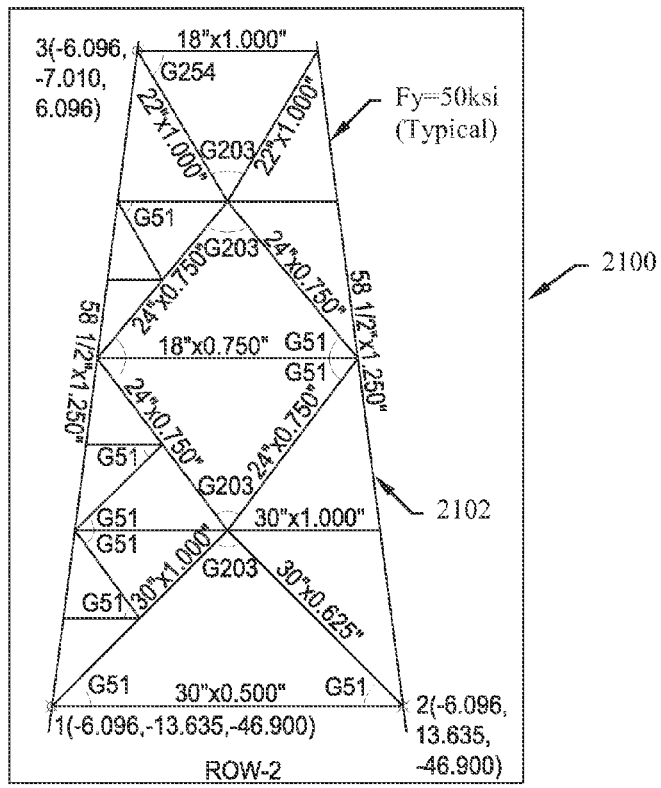
FIG. 21 illustrates a 2D drawing of a section of an exemplary jacket structure, and its 3D model applied to the jacket structure model.
Figure 21:
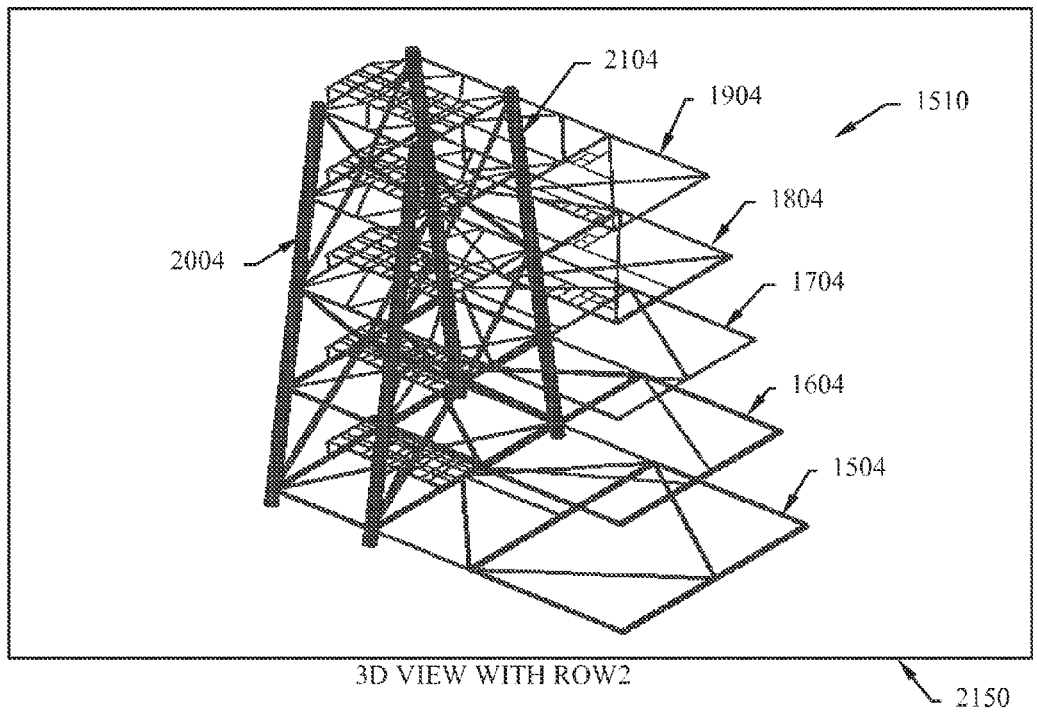
Figure 22:
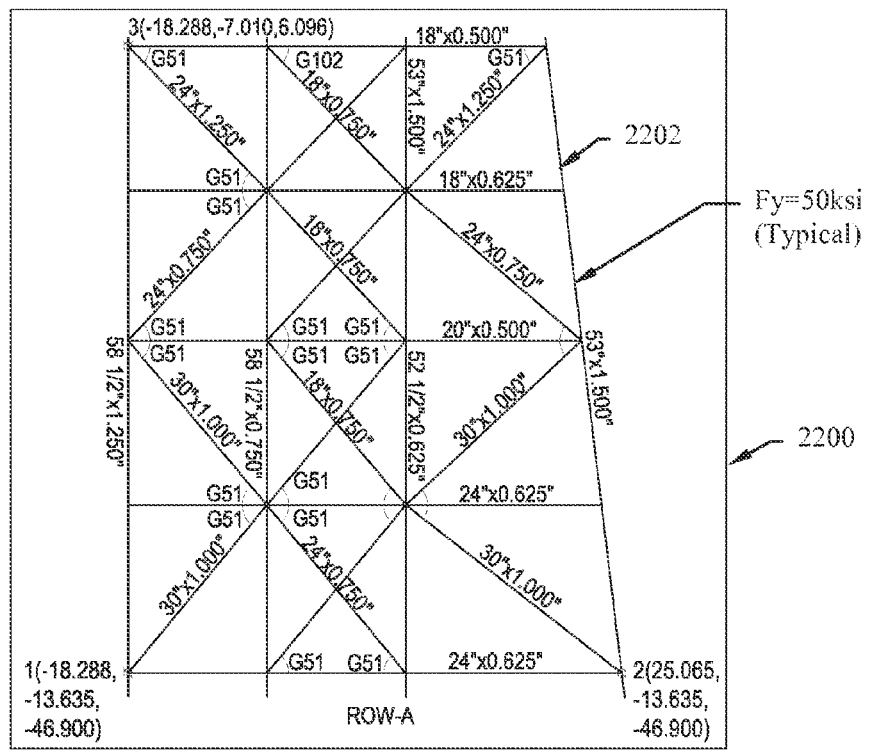
FIG. 22 illustrates a 2D drawing of a section of an exemplary jacket structure, and its 3D model applied to the jacket structure model.
Figure 22:
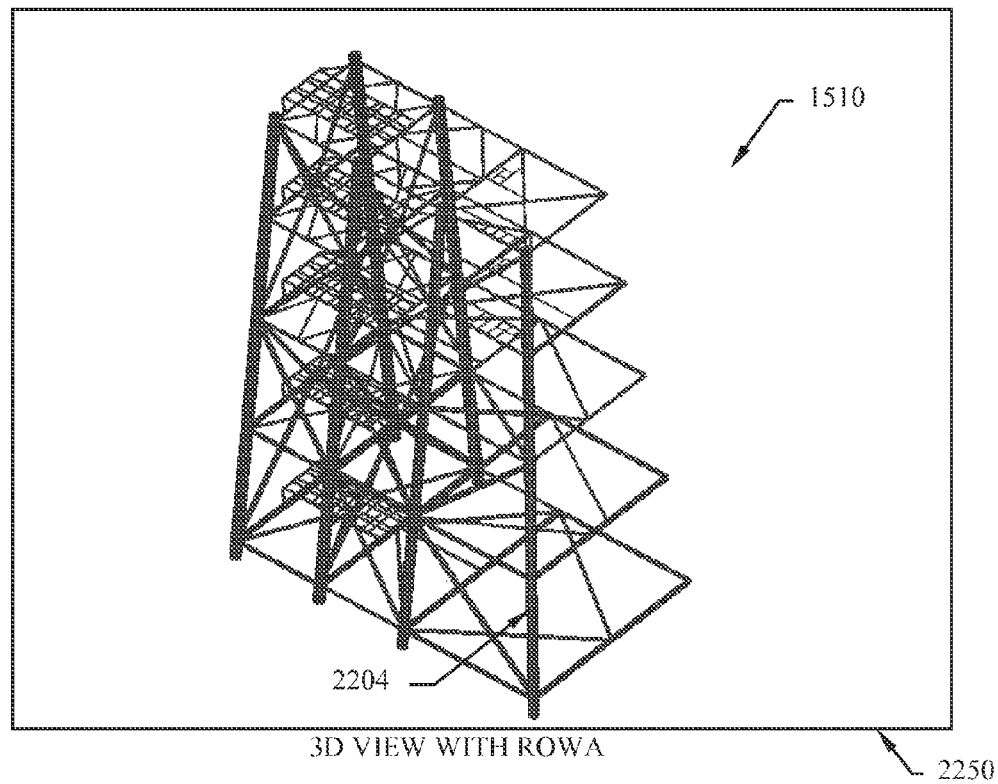
Figure 23:
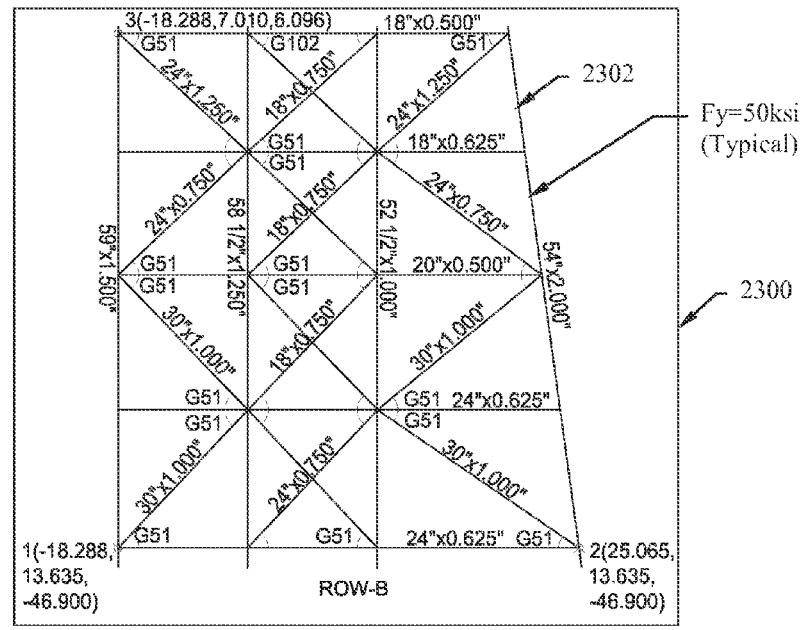
FIG. 23 illustrates a 2D drawing of a section of an exemplary jacket structure, and its 3D model applied to the jacket structure model.
Figure 23:
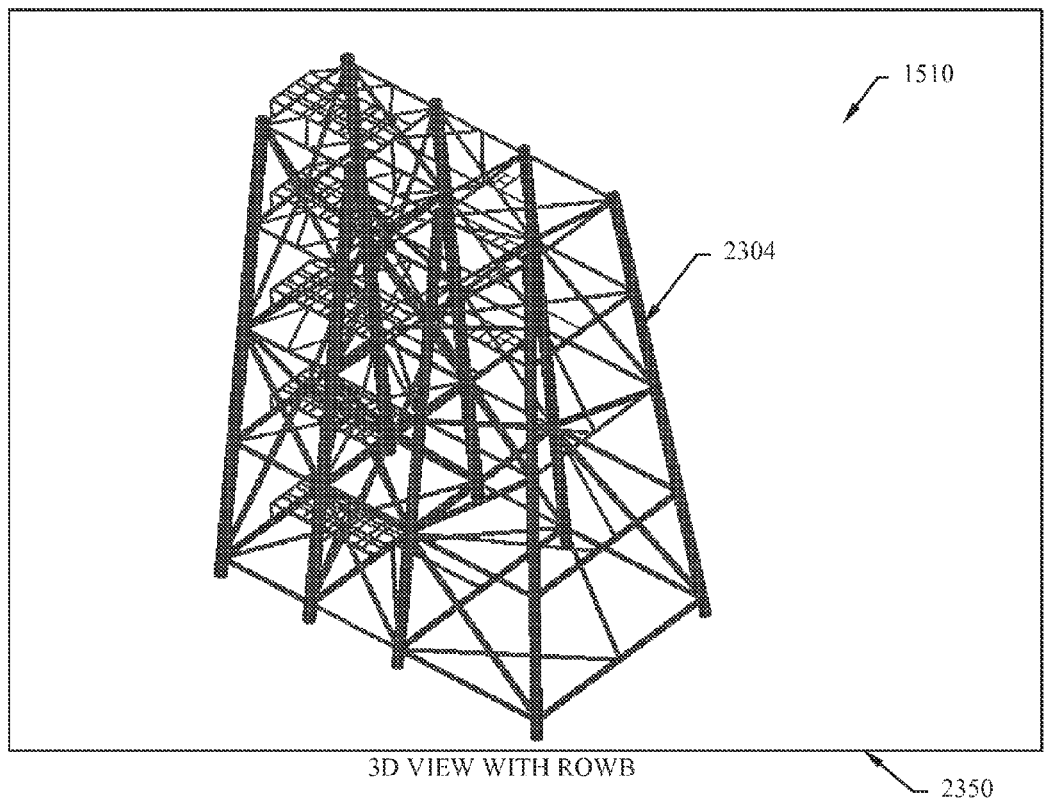
Figure 24:
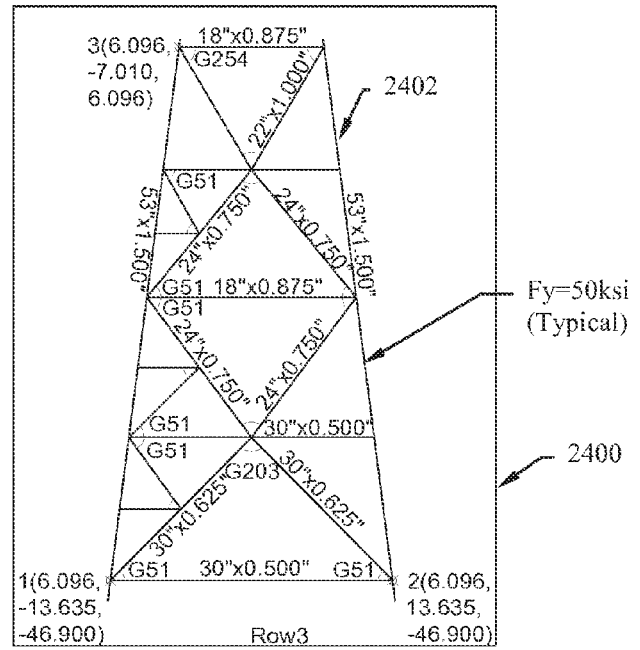
FIG. 24 illustrates a 2D drawing of a section of an exemplary jacket structure, and its 3D model applied to the jacket structure model.
Figure 24:
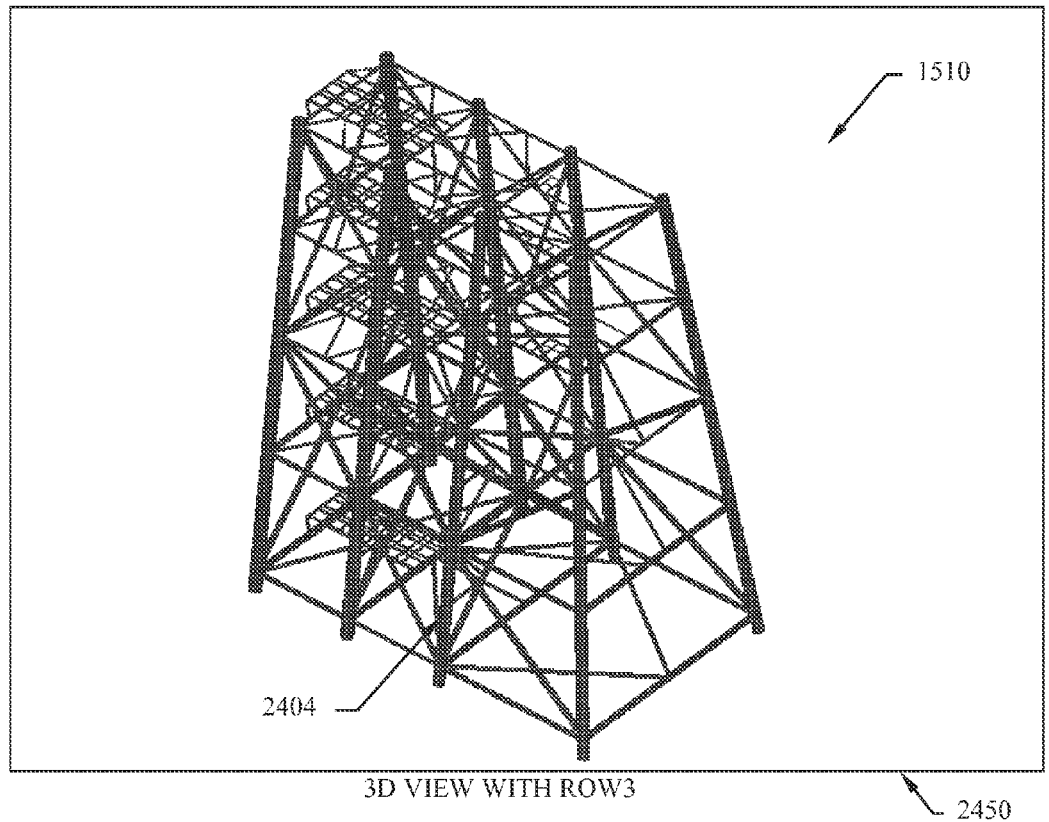
Figure 25:
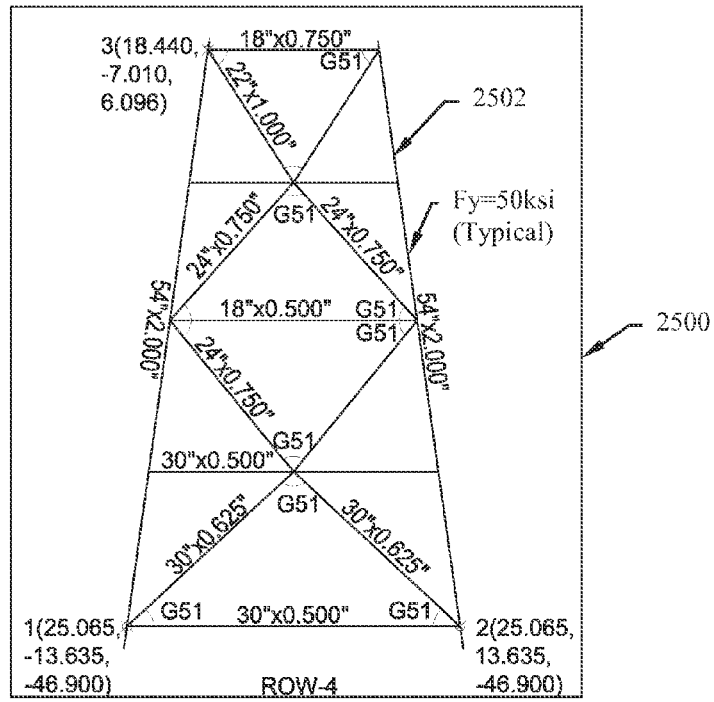
FIG. 25 illustrates a 2D drawing of a section of an exemplary jacket structure, and its 3D model applied to the jacket structure model.
Figure 25:
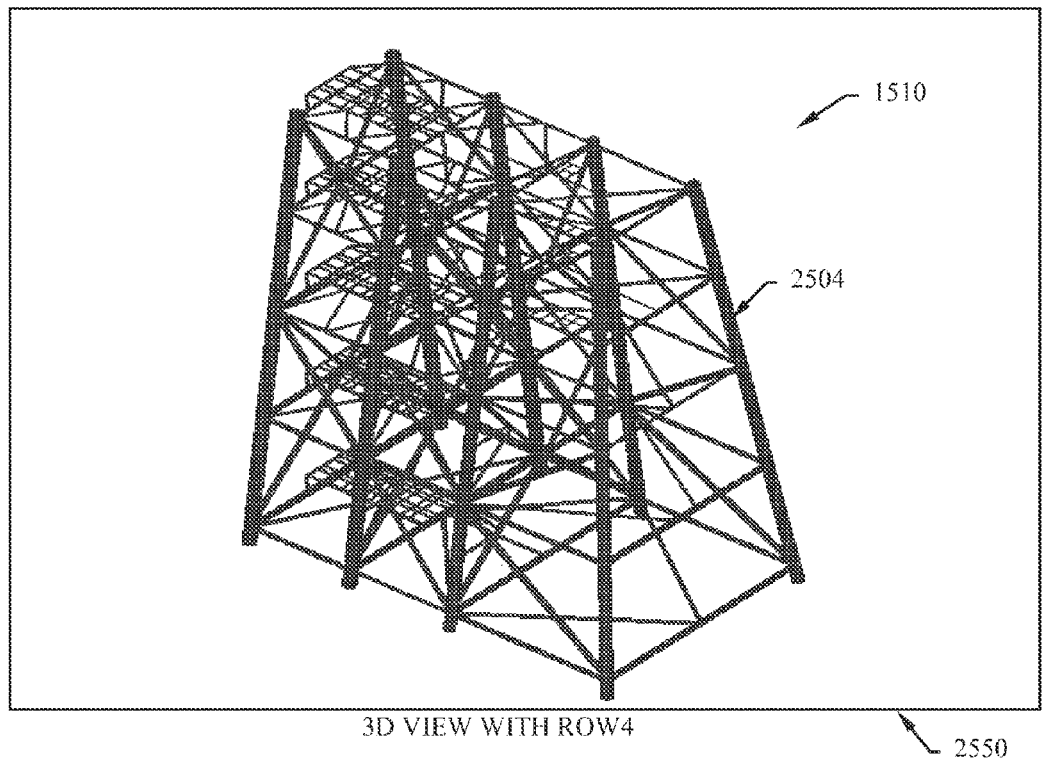
Figure 26:
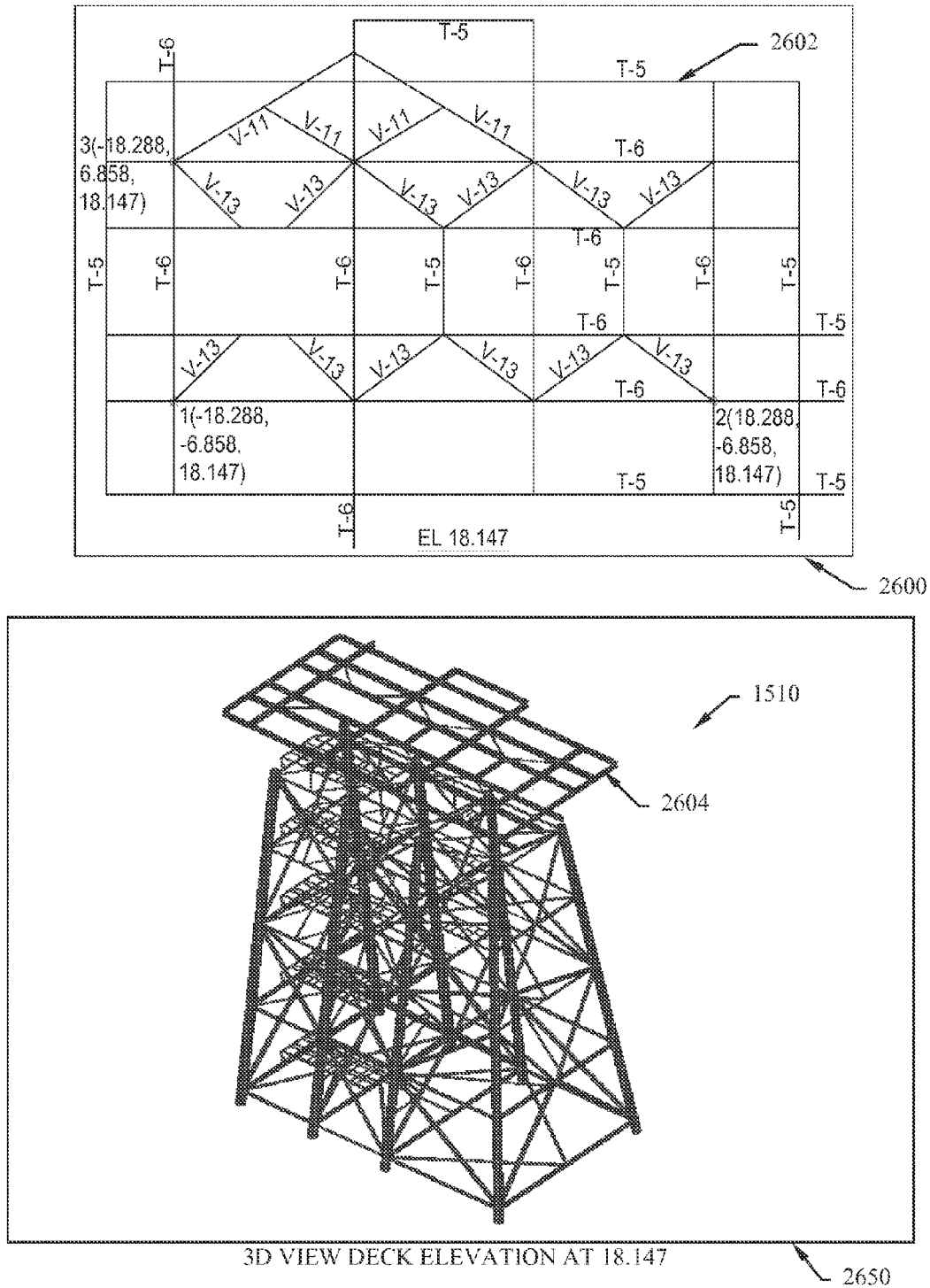
FIG. 26 illustrates a 2D drawing of a section of an exemplary jacket structure, and its 3D model applied to the jacket structure model.
Figure 27:
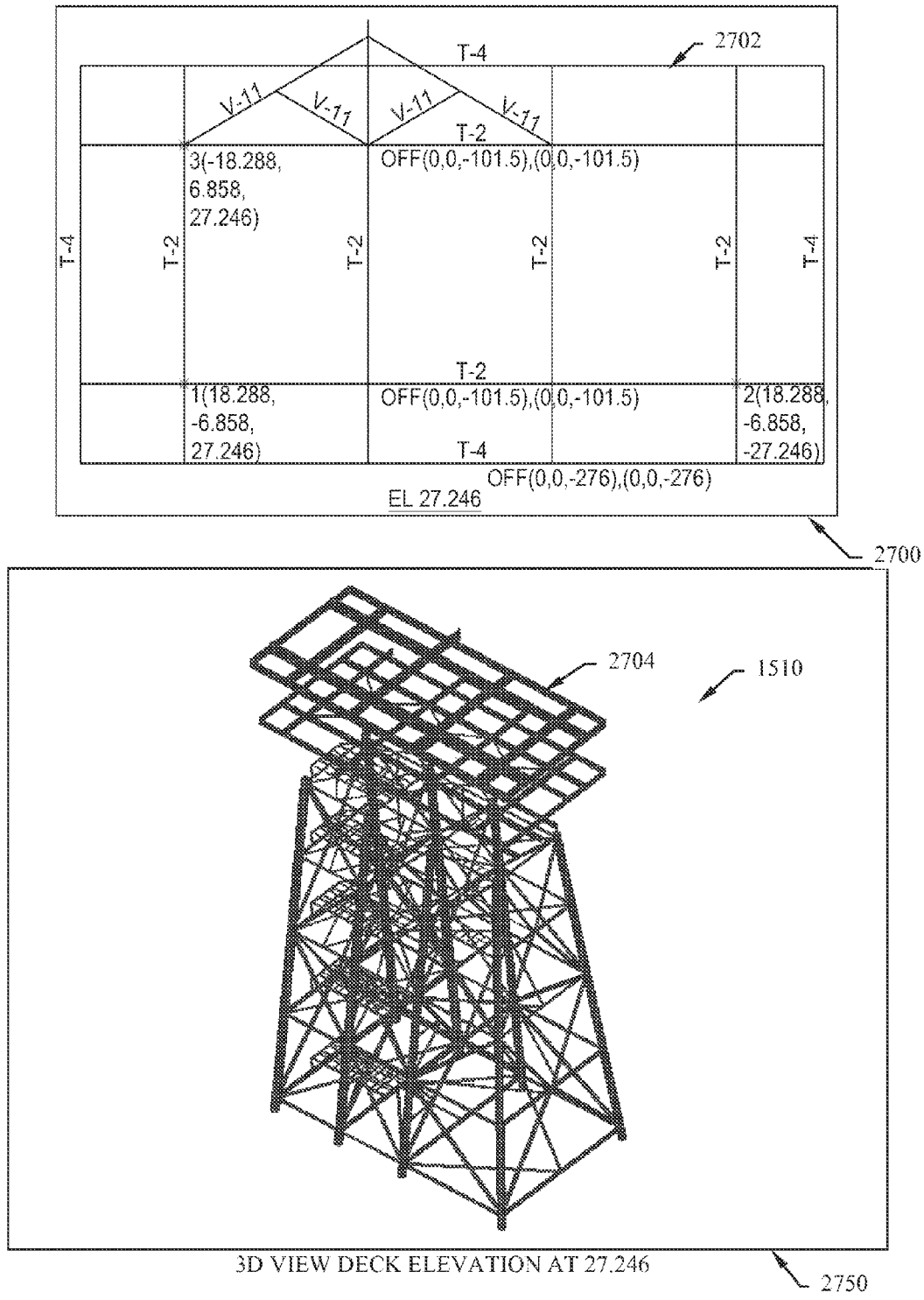
FIG. 27 illustrates a 2D drawing of a section of an exemplary jacket structure, and its 3D model applied to the jacket structure model.
Figure 28:
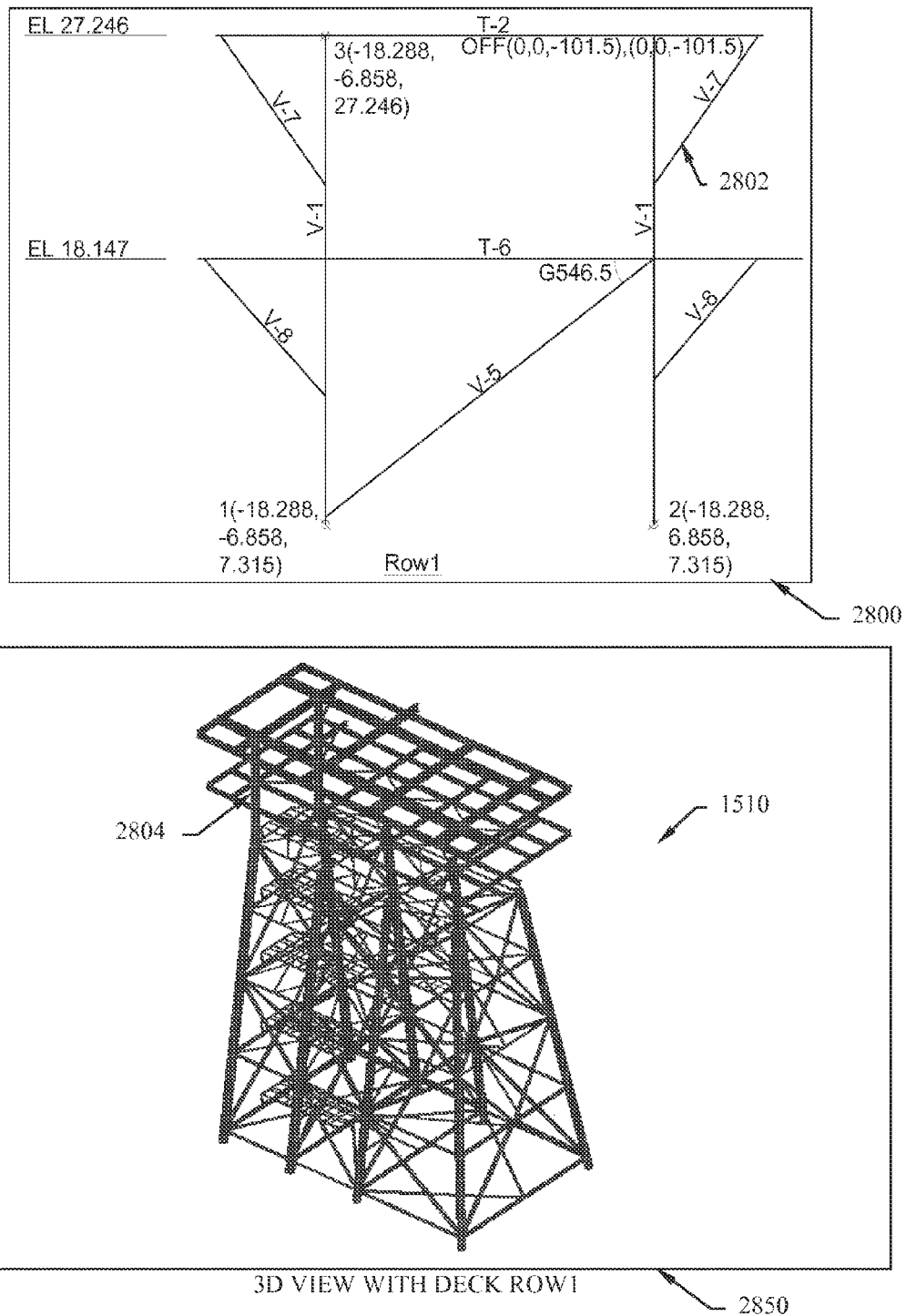
FIG. 28 illustrates a 2D drawing of a section of an exemplary jacket structure, and its 3D model applied to the jacket structure model.
Figure 29:
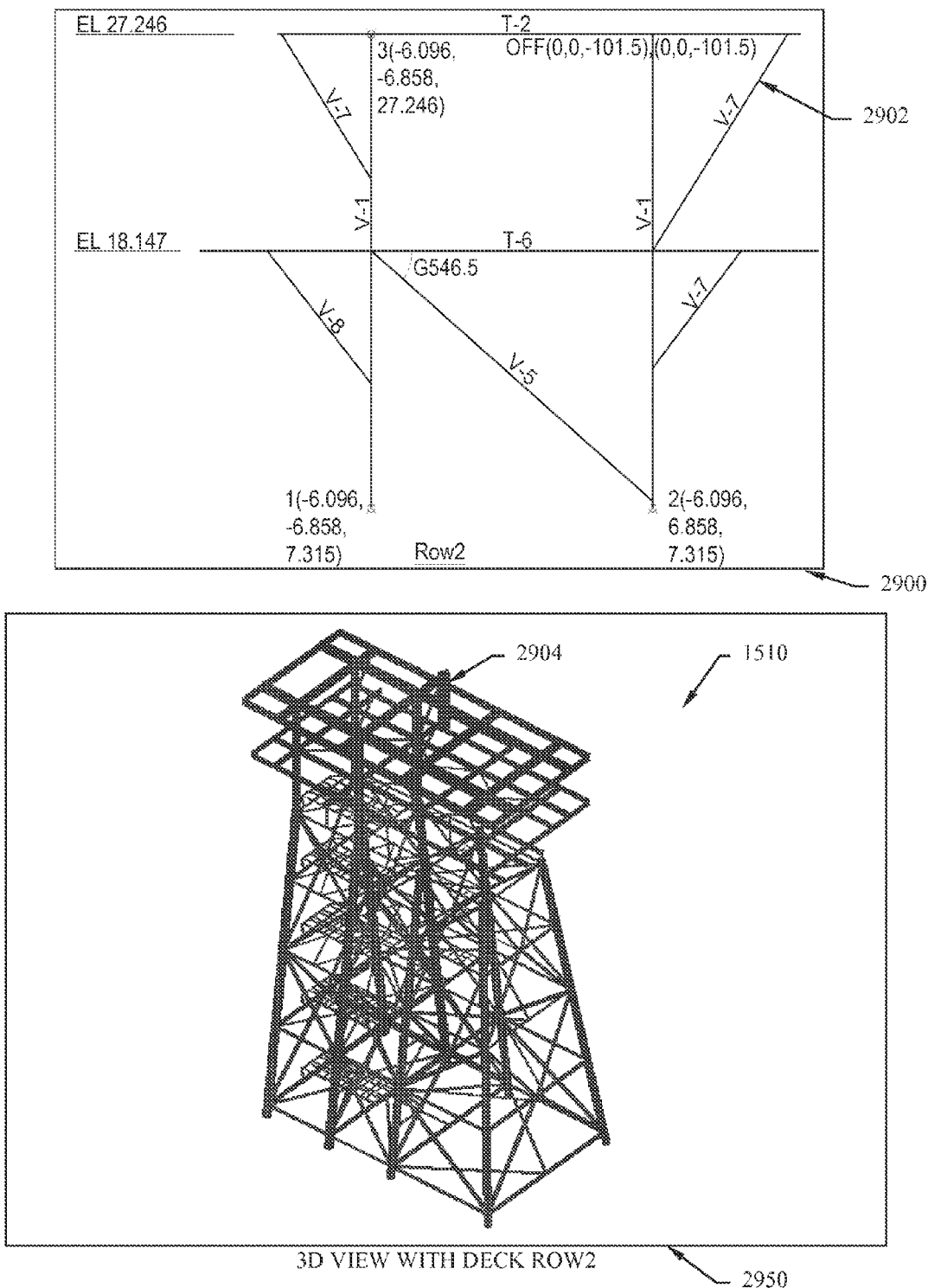
FIG. 29 illustrates a 2D drawing of a section of an exemplary jacket structure, and its 3D model applied to the jacket structure model.
Figure 30:
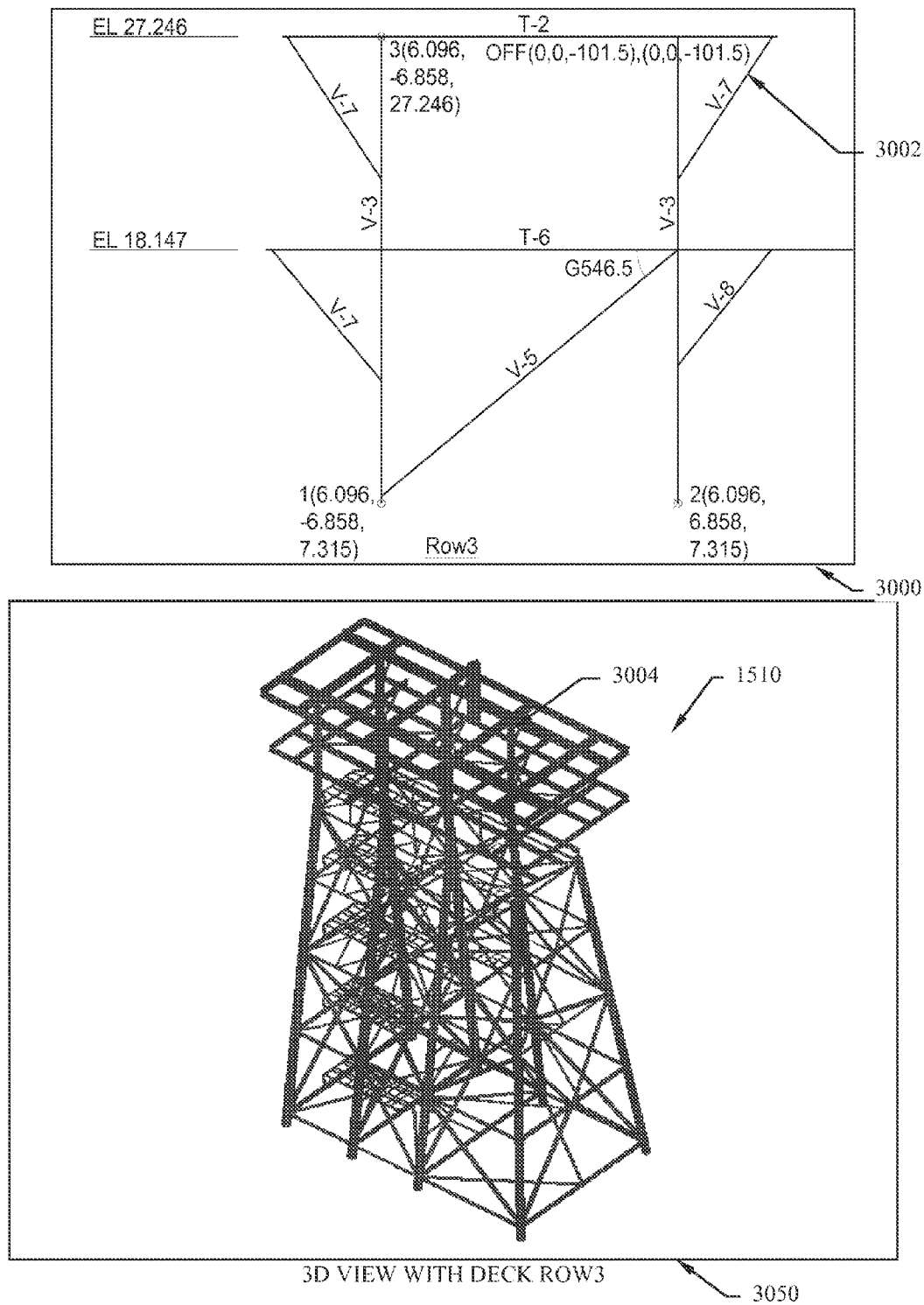
FIG. 30 illustrates a 2D drawing of a section of an exemplary jacket structure, and its 3D model applied to the jacket structure model.
Figure 31:
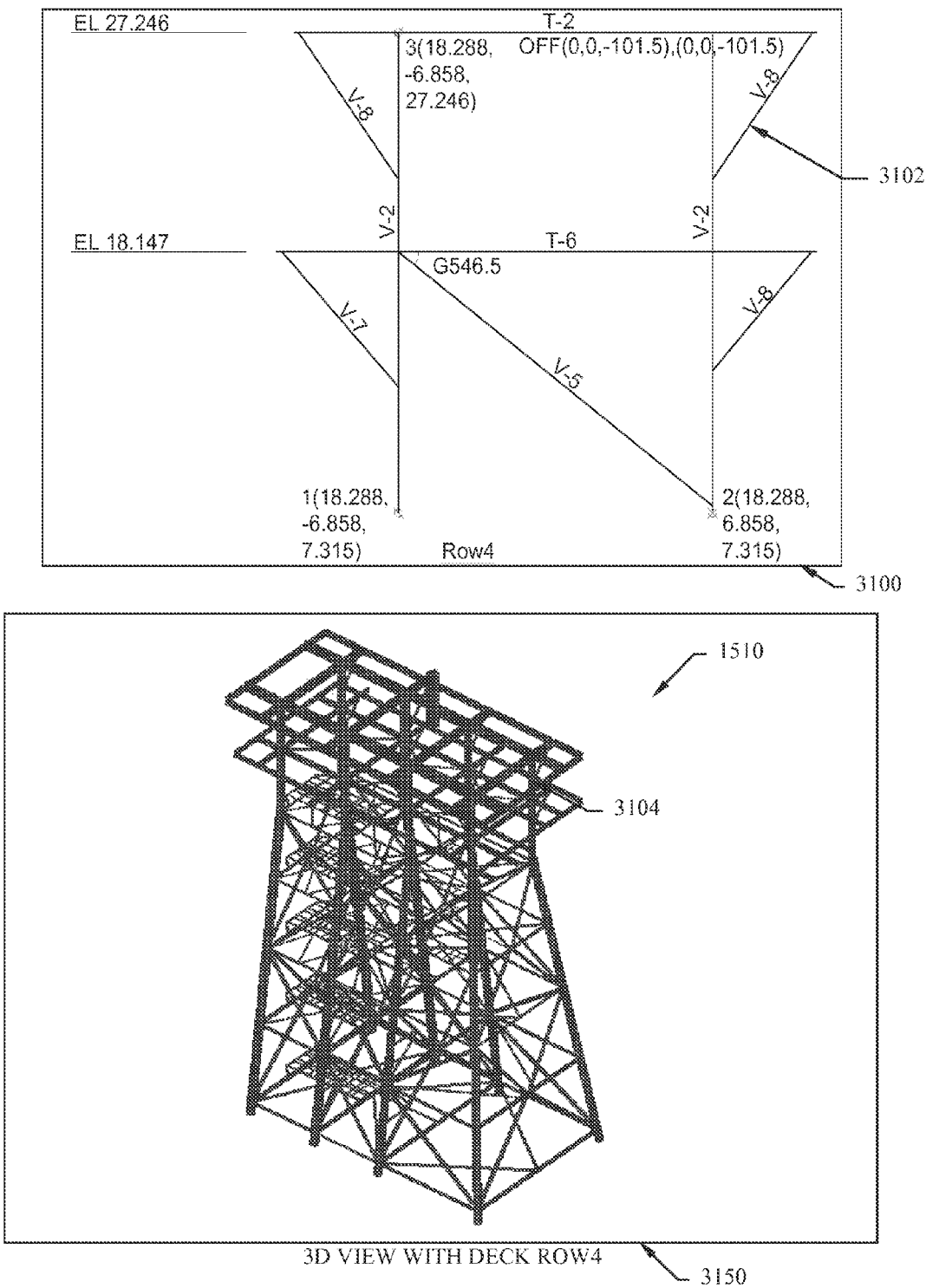
FIG. 31 illustrates a 2D drawing of a section of an exemplary jacket structure, and its 3D model applied to the jacket structure model.
Figure 32:
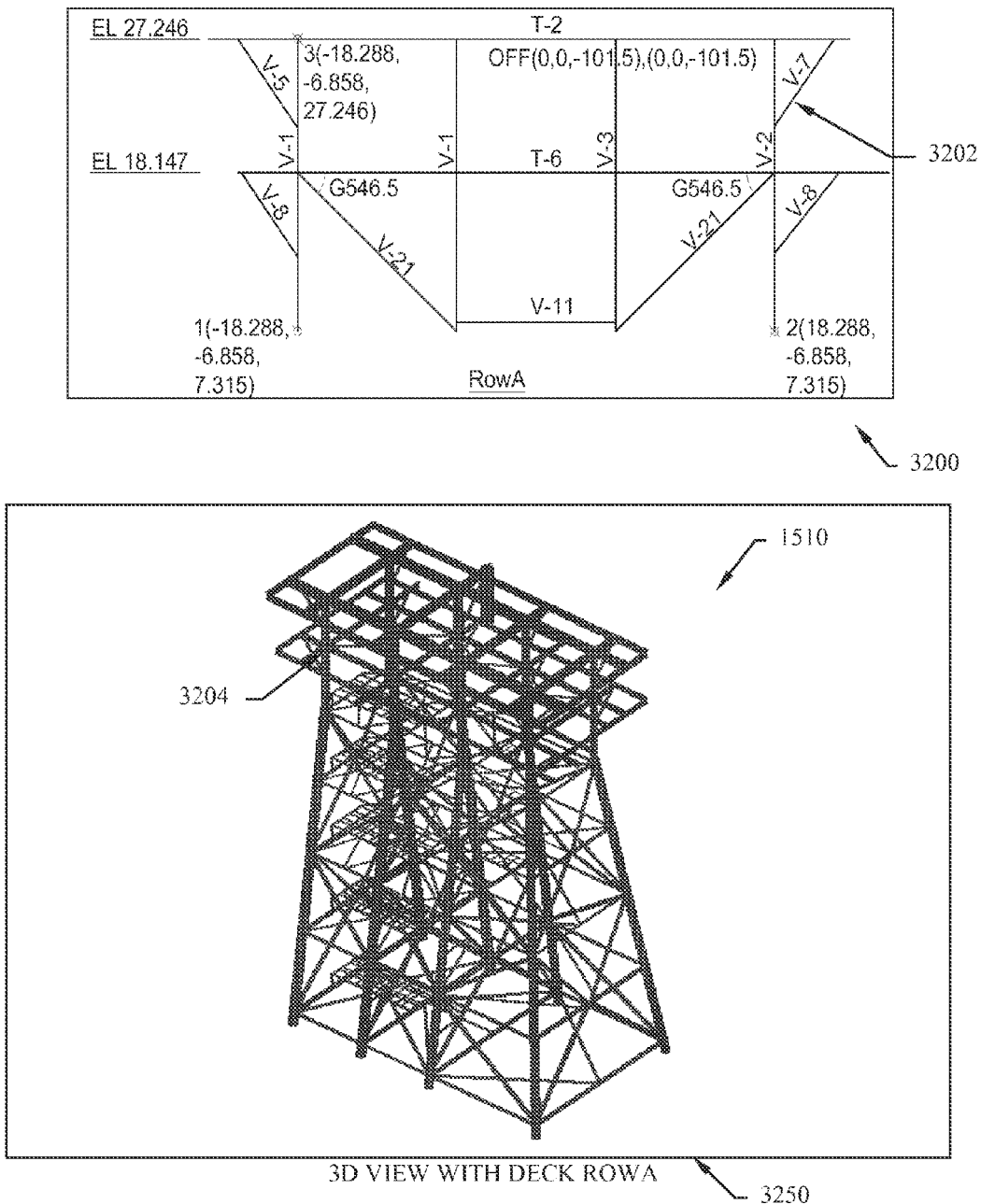
FIG. 32 illustrates a 2D drawing of a section of an exemplary jacket structure, and its 3D model applied to the jacket structure model.
Figure 33:
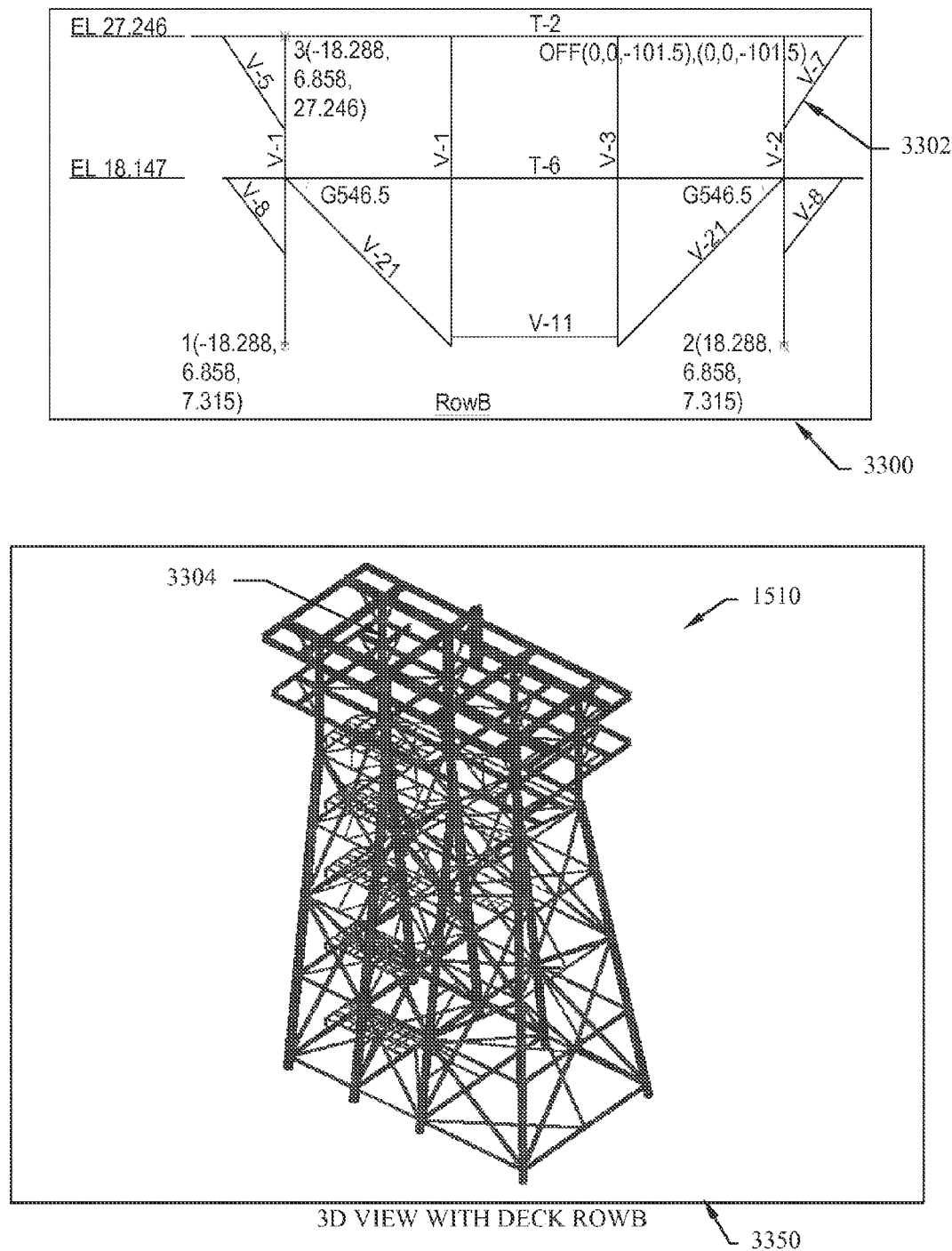
FIG. 33 illustrates a 2D drawing of a section of an exemplary jacket structure, and its 3D model applied to complete the jacket structure model.

The first object 1600 in FIG. 16 illustrates a view of an elevation deck 1602 in a 2D CAD drawing, and the second object 1650, illustrates the 3D model space 1510 showing the 3D model 1604 of the elevation deck 1602, in addition to the other models 1504 already generated in the 3D model space 1510.

Figure 15:
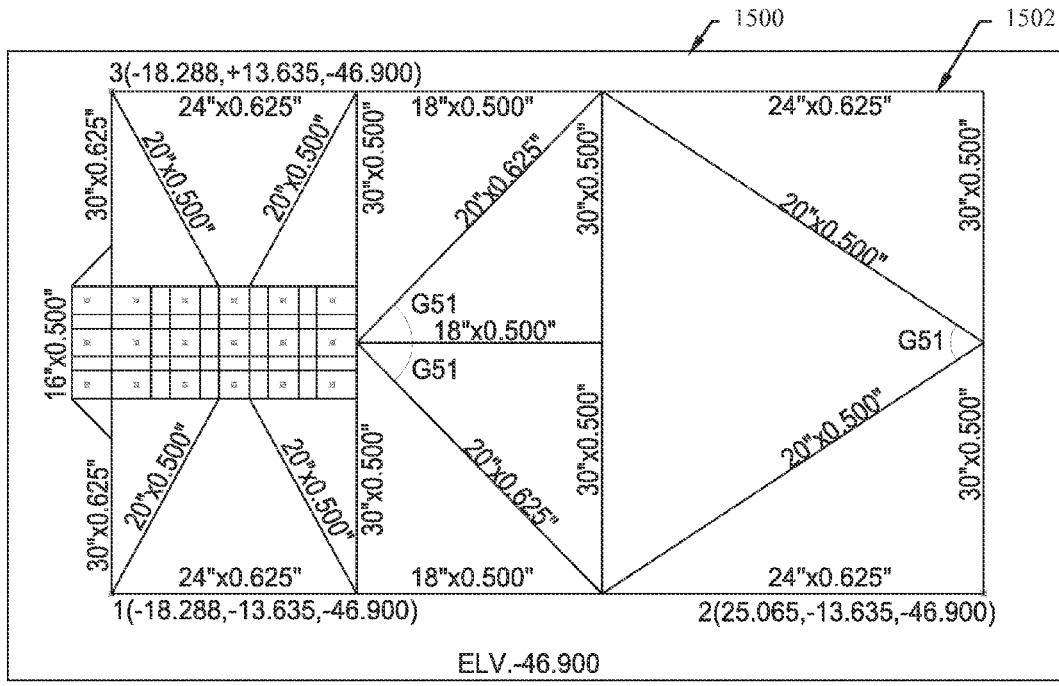
FIG. 15 illustrates a 2D drawing of a section of an exemplary jacket structure, and its 3D model.
Figure 15:
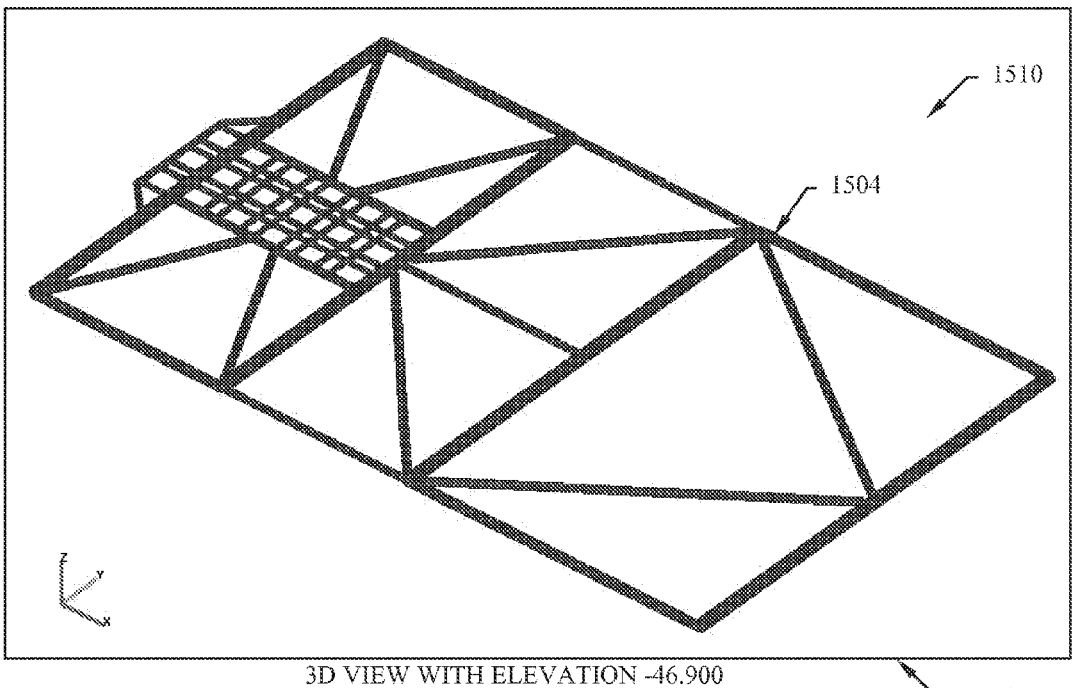

FIGS. 17-33 continue to illustrate the generation of the exemplary jacket structure 3D model as illustrated in FIGS. 15 and 16; wherein the 3D model space 1510 contains the newly-generated 3D model in addition to all previously generated 3D models.

Once all the views have been converted into their 3D structure and added to the 3D space, the 3D model is complete. If there are more views to convert, the system continues to loop to the next 2D view in the set of drawings until all views in the drawing are converted.

Loop to Next 2D View

As the user selects a view using the selection window tool, the view is converted to its 3D coordinates. If the selected view is the first view of the session, the 3D model of the selected view will become the first model in the 3D drawing space. If it is not the first view of the session, then it is merged with the existing 3D models in the 3D drawing space. At that time, the user may select another view from the drawings in the session. Once all the views are exhausted, the current 3D model in the 3D drawing space becomes the final model.

The 3D model in the 3D drawing space may be provided for, or imported into, other CAD modeling programs through standardized document exchange formats. This provides for the flexibility and adaptability of the 3D model generated by the disclosed system for use with various CAD programs.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for converting the (X,Y) coordinates of a point in a 2D drawing to its corresponding (X,Y,Z) coordinates in 3D space, the method comprising:
   (a) selecting a 2D view in a CAD drawing of an object;
   (b) receiving user-identified selections of three non-collinear control points in the 2D view in which the three non-collinear control points represent relative orientation, scale and position with respect to each other in both the 2D view and a 3D global physical view of the object, and wherein the CAD drawing comprises (X,Y) coordinates for locations of all points in the 2D view;
   (c) receiving user-input (X,Y,Z) coordinates of the three control points in the 3D global physical view corresponding to the (X,Y) coordinates of the three non-collinear control points in the 2D view;
   (d) computing a coordinate transformation matrix for the 2D view, the coordinate transformation matrix comprising an orientation and scale matrix (R) containing orientation and scale of the three non-collinear control points in the 2D view, and a position matrix (T) containing positions of the three non-collinear control points with respect to the 3D global physical view, based on the (X,Y) and user-input (X,Y,Z) coordinates of the three non-collinear control points;
   (e) automatically converting (X,Y) coordinates of remaining points in the 2D view into corresponding (X,Y,Z) coordinates of those remaining points in the 3D global physical view using the coordinate transformation matrix; and
   (f) generating, in the 3D global physical view, a 3D model of the object using the (X,Y,Z) coordinates of the three non-collinear control points and the remaining points in the 2D view.

2. The method according to claim 1, wherein the CAD drawing comprises features of the object shown on different layers.

3. The method according to claim 2, wherein the different layers include a hidden line layer, a struct line layer, a center line layer, and a text layer.

4. The method according to claim 3, wherein the CAD drawing further comprises a complex layer, a master layer, and a 3D-points layer.

5. The method according to claim 2, wherein a section property of the object in the CAD drawing is defined relative to its center line on a separate layer.

6. The method according to claim 5, the method further comprising associating section properties on each layer in the 2D view of the CAD drawing with each section property's center line.

7. The method according to claim 1, wherein X values and Y values in the (X,Y) coordinate of the three non-collinear control points in the 2D view have different scales.

8. The method according to claim 1, wherein the coordinate transformation matrix for three control points (1, 2 and 3) are represented in the 2D view by coordinates $(X_{dn}, Y_{dn})$, where "d" means 2D drawing and "n" is one of the control points, and represented in the 3D global physical view by coordinates $(X_{gn}, Y_{gn}, Z_{gn})$, where "g" means 3D global physical view and "n" is the control point, is provided by the expression:

$$\begin{Bmatrix} X_{gn} \\ Y_{gn} \\ Z_{gn} \end{Bmatrix} = \{T\}_{3 \times 1} + [R]_{3 \times 2} \begin{Bmatrix} X_{dn} \\ Y_{dn} \end{Bmatrix},$$

wherein the orientation and scale matrix (R) for the three control points (1, 2, and 3) is provided by the expression:

$$R = \begin{bmatrix} X_{g2} - X_{g1} & X_{g3} - X_{g1} \\ Y_{g2} - Y_{g1} & Y_{g3} - Y_{g1} \\ Z_{g2} - Z_{g1} & Z_{g3} - Z_{g1} \end{bmatrix} \begin{bmatrix} X_{d2} - X_{d1} & X_{d3} - X_{d1} \\ Y_{d2} - Y_{d1} & Y_{d3} - Y_{d1} \end{bmatrix}^{-1},$$

and wherein the position matrix (T) for the three control points (1, 2, and 3) is provided by the expression:

$$T = \begin{Bmatrix} X_{g1} \\ Y_{g1} \\ Z_{g1} \end{Bmatrix} - [R] \begin{Bmatrix} X_{d1} \\ Y_{d1} \end{Bmatrix}.$$

9. The method according to claim 8, wherein two different vectors represent the (X,Y) coordinates of the three control points, and three different vectors represent the (X,Y,Z) coordinates of the three control points.

10. The method according to claim 1, the method further comprising:
(g) repeating said steps (a) through (f) for a second 2D view of the CAD drawing of the object using three corresponding second control points, and a corresponding second coordinate transformation matrix, to generate corresponding a second portion of the 3D model; and
(h) generating a final 3D model of the object in the 3D global physical view using the first and second 3D models.

11. The method according to claim 10, wherein the first and 2D views are provided via different corresponding CAD programs.

12. A computer-readable medium for use in general computer, the computer-readable medium storing instructions executable by the general computer for performing a process for converting the (X,Y) coordinates of a point in a 2D drawing to its corresponding (X,Y,Z) coordinates in 3D space, the process comprising:
(a) selecting a 2D view in a CAD drawing of an object;
(b) receiving user-identified selections of three non-collinear control points in the 2D view in which the three non-collinear control points represent relative orientation, scale and position with respect to each other in both the 2D view and a 3D global physical view of the object, and wherein the CAD drawing comprises (X,Y) coordinates for locations of all points in the 2D view;
(c) receiving user-input (X,Y,Z) coordinates of the three control points in the 3D global physical view corresponding to the (X,Y) coordinates of the three non-collinear control points in the 2D view;
(d) computing a coordinate transformation matrix for the 2D view, the coordinate transformation matrix comprising an orientation and scale matrix (R) containing orientation and scale of the three non-collinear control points in the 2D view, and a position matrix (T) containing positions of the three non-collinear control points with respect to the 3D global physical view, based on the (X,Y) and user-input (X,Y,Z) coordinates of the three non-collinear control points;
(e) automatically converting (X,Y) coordinates of remaining points in the 2D view into corresponding (X,Y,Z) coordinates of those remaining points in the 3D global physical view using the coordinate transformation matrix; and
(f) generating, in the 3D global physical view, a 3D model of the object using the (X,Y,Z) coordinates of the three non-collinear control points and the remaining points in the 2D view.

13. The computer-readable medium according to claim 12, wherein the CAD drawing comprises features of the object shown on different layers.

14. The computer-readable medium according to claim 13, wherein the different layers may include a hidden line layer, a struct line layer, a center line layer, and a text layer.

15. The computer-readable medium according to claim 14, wherein the CAD drawing further comprises a complex layer, a master layer, and a 3D-points layer.

16. The computer-readable medium according to claim 13, wherein a section property of the object in the CAD drawing is defined relative to its center line on a separate layer.

17. The computer-readable medium according to claim 16, the method further comprising associating section properties on each layer in the 2D view of the CAD drawing with each section property's center line.

18. The computer-readable medium according to claim 1, wherein X values and Y values in the (X,Y) coordinate of the three non-collinear control points in the 2D view have different scales.

19. The computer-readable medium according to claim 1, wherein the coordinate transformation matrix for three exemplary control points (1, 2 and 3) are represented in the 2D view by coordinates $(X_{dn}, Y_{dn})$, where "d" means 2D drawing and "n" is one of the exemplary control points, and represented in the 3D global physical view by coordinates $(X_{gn}, Y_{gn}, Z_{gn})$, where "g" means 3D global physical view and "n" is one of the exemplary control points, is provided by the expression:

$$\begin{Bmatrix} X_{gn} \\ Y_{gn} \\ Z_{gn} \end{Bmatrix} = \{T\}_{3 \times 1} + [R]_{3 \times 2} \begin{Bmatrix} X_{dn} \\ Y_{dn} \end{Bmatrix},$$

wherein the orientation and scale matrix (R) for the three exemplary control points (1, 2, and 3) is provided by the expression:

$$R = \begin{bmatrix} X_{g2} - X_{g1} & X_{g3} - X_{g1} \\ Y_{g2} - Y_{g1} & Y_{g3} - Y_{g1} \\ Z_{g2} - Z_{g1} & Z_{g3} - Z_{g1} \end{bmatrix} \begin{bmatrix} X_{d2} - X_{d1} & X_{d3} - X_{d1} \\ Y_{d2} - Y_{d1} & Y_{d3} - Y_{d1} \end{bmatrix}^{-1},$$

and wherein the position matrix (T) for the three exemplary control points (1, 2, and 3) is provided by the expression:

$$T = \begin{Bmatrix} X_{g1} \\ Y_{g1} \\ Z_{g1} \end{Bmatrix} - [R] \begin{Bmatrix} X_{d1} \\ Y_{d1} \end{Bmatrix}.$$

20. The computer-readable medium according to claim 19, wherein two different vectors represent the (X,Y) coordinates of the three exemplary control points, and three different vectors represent the (X,Y,Z) coordinates of the three exemplary control points.

21. The computer-readable medium according to claim 12, the method further comprising:
  (g) repeating said steps (a) through (f) for a second 2D view of the CAD drawing of the object using three corresponding second control points, and a corresponding second coordinate transformation matrix, to generate corresponding a second portion of the 3D model; and
  (h) generating a final 3D model of the object in the 3D global physical view using the first and second 3D models.

22. The computer-readable medium according to claim 21, wherein the first and second 2D views are provided via different corresponding CAD programs.

23. A method for converting the (X,Y) coordinates of a point in a 2D drawing to its corresponding (X,Y,Z) coordinates in 3D space, the method comprising:
  (a) selecting a first 2D view in a CAD drawing of an object, wherein the CAD drawing comprises features of the object shown on different layers that include a hidden line layer, a struct line layer, a center line layer, and a text layer;
  (b) receiving user-identified selections of at least three first non-collinear control points in the first 2D view in which the control points represent relative orientation, scale and position with respect to each other in both the first 2D view and a 3D global physical view of the object, and wherein the CAD drawing comprises (X,Y) coordinates for locations of all points in the first 2D view;
  (c) receiving user-input (X,Y,Z) coordinates of the at least three first non-collinear control points in the 3D global physical view corresponding to the (X,Y) coordinates of the at least three first non-collinear control points in the first 2D view;
  (d) computing a first coordinate transformation matrix for the first 2D view, the first coordinate transformation matrix comprising an orientation and scale matrix (R) containing orientation and scale of the at least three first non-collinear control points in the first 2D view, and a position matrix (T) containing positions of the at least three first non-collinear control points with respect to the 3D global physical view, based on the (X,Y) and user-input (X,Y,Z) coordinates of the at least three first non-collinear control points;
  (e) automatically converting (X,Y) coordinates of remaining points in the first 2D view into corresponding (X,Y,Z) coordinates of those remaining points in the 3D global physical view using the first coordinate transformation matrix;
  (f) generating, in the 3D global physical view, a first 3D model of the object using the (X,Y,Z) coordinates of the first control points and the remaining points in the first 2D view;
  (g) repeating steps (a) through (f) for at least a second 2D view of the CAD drawing of the object using at least three corresponding second control points, and a corresponding second coordinate transformation matrix, to generate a corresponding second 3D model of the object; and
  (h) generating a final 3D model of the object in the 3D global physical view using the first and second 3D models.

24. The method according to claim 23, wherein the CAD drawing further comprises a complex layer, a master layer, and a 3D-points layer.

25. The method according to claim 23, wherein a section property of the object in the CAD drawing is defined relative to its center line on a separate layer.

26. The method according to claim 25, the method further comprising associating section properties on each layer in one or both of the 2D views of the CAD drawing with each section property's center line.

27. The method according to claim 23, wherein X values and Y values in the (X,Y) coordinate of at least three non-collinear control points in one or both of the 2D views have different scales.

28. The method according to claim 23, wherein the coordinate transformation matrix for three exemplary control points (1, 2 and 3) are represented in one or both of the 2D views by coordinates $(X_{dn}, Y_{dn})$, where "d" means 2D drawing and "n" is one of the exemplary control points, and represented in the 3D global view by coordinates $(X_{gn}, Y_{gn}, Z_{gn})$, where "g" means 3D global physical view and "n" is one of the exemplary control points, is provided by the expression:

$$\begin{Bmatrix} X_{gn} \\ Y_{gn} \\ Z_{gn} \end{Bmatrix} = \{T\}_{3\times 1} + [R]_{3\times 2} \begin{Bmatrix} X_{dn} \\ Y_{dn} \end{Bmatrix},$$

wherein the orientation and scale matrix (R) for the three exemplary control points (1, 2, and 3) is provided by the expression:

$$R = \begin{bmatrix} X_{g2} - X_{g1} & X_{g3} - X_{g1} \\ Y_{g2} - Y_{g1} & Y_{g3} - Y_{g1} \\ Z_{g2} - Z_{g1} & Z_{g3} - Z_{g1} \end{bmatrix} \begin{bmatrix} X_{d2} - X_{d1} & X_{d3} - X_{d1} \\ Y_{d2} - Y_{d1} & Y_{d3} - Y_{d1} \end{bmatrix}^{-1},$$

and wherein the position matrix (T) for the three exemplary control points (1, 2, and 3) is provided by the expression:

$$T = \begin{Bmatrix} X_{g1} \\ Y_{g1} \\ Z_{g1} \end{Bmatrix} - [R] \begin{Bmatrix} X_{d1} \\ Y_{d1} \end{Bmatrix}.$$

29. The method according to claim 28, wherein two different vectors represent the (X,Y) coordinates of the three exemplary control points, and three different vectors represent the (X,Y,Z) coordinates of the three exemplary control points.

30. The method according to claim 23, wherein the first and second 2D views are provided via different corresponding CAD programs.

* * * * *